US011926030B2

(12) United States Patent
Yoshikane et al.

(10) Patent No.: US 11,926,030 B2
(45) Date of Patent: Mar. 12, 2024

(54) POWER TOOL HAVING HAMMER MECHANISM

(71) Applicant: MAKITA CORPORATION, Anjo (JP)

(72) Inventors: Kiyonobu Yoshikane, Anjo (JP); Yoshiro Tada, Anjo (JP)

(73) Assignee: MAKITA CORPORATION, Anjo (JP)

( * ) Notice: Subject to any disclaimer, the term of this patent is extended or adjusted under 35 U.S.C. 154(b) by 104 days.

(21) Appl. No.: 17/396,863

(22) Filed: Aug. 9, 2021

(65) Prior Publication Data

US 2022/0055198 A1 Feb. 24, 2022

(30) Foreign Application Priority Data

Aug. 24, 2020 (JP) ................................ 2020-140897
Aug. 24, 2020 (JP) ................................ 2020-140902

(51) Int. Cl.
*B25D 11/06* (2006.01)
*B25D 17/04* (2006.01)
*B25D 16/00* (2006.01)

(52) U.S. Cl.
CPC ........... *B25D 17/043* (2013.01); *B25D 11/06* (2013.01); *B25D 16/006* (2013.01); (Continued)

(58) Field of Classification Search
CPC .... B25D 11/06; B25D 16/006; B25D 17/043; B25D 2250/095; B25D 2250/121; B25D 2250/221
See application file for complete search history.

(56) References Cited

U.S. PATENT DOCUMENTS 4,401,167 A * 8/1983 Sekizawa ............ B25D 17/043 248/573
4,711,308 A * 12/1987 Blaas .................. B25D 17/043 16/431

(Continued)

FOREIGN PATENT DOCUMENTS

JP 2010-007571 A 1/2010
JP 2014-172145 A 9/2014

(Continued)

OTHER PUBLICATIONS

Jan. 9, 2024 Office Action issued in Japanese Application No. 2020-140897.

(Continued)

*Primary Examiner* — Thomas M Wittenschlaeger
*Assistant Examiner* — David G Shutty
(74) *Attorney, Agent, or Firm* — Oliff PLC

(57) ABSTRACT

A power tool includes a motor, a driving mechanism, a main housing, a handle housing, a first guide part and a second guide part. The handle housing is movable relative to the main housing at least in a front-rear direction. The first and second guide parts are configured to guide relative sliding between the main housing and the handle housing in the front-rear direction. Each of the first guide part and the second guide part includes a first engagement part and a second engagement part engaged with each other to be slidable in the front-rear direction. The main housing has the first engagement part. The handle housing has the second engagement part. The second guide part is spaced apart from the first guide part and located rearward of the first guide part in the front-rear direction.

20 Claims, 14 Drawing Sheets

(52) U.S. Cl.
CPC .. *B25D 2250/095* (2013.01); *B25D 2250/121* (2013.01); *B25D 2250/221* (2013.01)

(56) References Cited

U.S. PATENT DOCUMENTS

| | | | | | |
|---|---|---|---|---|---|
| 5,522,466 | A * | 6/1996 | Harada | B25D 17/043 173/162.2 |
| 6,076,616 | A * | 6/2000 | Kramp | B25D 17/043 173/211 |
| 6,148,930 | A * | 11/2000 | Berger | B25D 17/043 267/137 |
| 7,320,369 | B2 * | 1/2008 | Stirm | B25D 17/043 173/162.1 |
| 8,069,930 | B2 * | 12/2011 | Engelfried | B25D 17/043 173/162.1 |
| 8,191,648 | B2 * | 6/2012 | Watanabe | B25D 17/06 173/104 |
| 8,240,395 | B2 * | 8/2012 | Kamegai | B25D 17/04 173/162.1 |
| 8,708,059 | B2 * | 4/2014 | Hahn | B25D 17/24 173/162.1 |
| 2003/0006051 | A1 * | 1/2003 | Schmitzer | B25D 17/043 173/2 |
| 2004/0177981 | A1 * | 9/2004 | Berger | B25D 11/005 173/212 |
| 2006/0011365 | A1 * | 1/2006 | Stirm | B25D 17/043 173/162.2 |
| 2006/0219418 | A1 * | 10/2006 | Arakawa | B25F 5/006 173/162.1 |
| 2007/0289762 | A1 * | 12/2007 | Kikukchi | B25D 17/043 173/162.1 |
| 2009/0314507 | A1 * | 12/2009 | Iwakami | B25D 17/043 173/162.2 |
| 2009/0321101 | A1 * | 12/2009 | Furusawa | B25F 5/006 173/162.2 |
| 2010/0018734 | A1 * | 1/2010 | Frauhammer | B25D 16/006 200/332 |
| 2010/0253162 | A1 * | 10/2010 | Sakamaki | B25D 16/00 310/50 |
| 2013/0025897 | A1 * | 1/2013 | Harcar | B25D 17/043 173/162.2 |
| 2013/0199810 | A1 * | 8/2013 | Wyler | B25D 16/006 173/162.2 |
| 2014/0174777 | A1 * | 6/2014 | Kakiuchi | B25F 5/006 173/117 |
| 2014/0352994 | A1 * | 12/2014 | Yoshikane | B25D 17/043 173/162.2 |
| 2015/0144366 | A1 * | 5/2015 | Machida | B25D 16/00 173/104 |
| 2015/0266176 | A1 * | 9/2015 | Takeuchi | B25D 17/24 173/117 |
| 2016/0136801 | A1 * | 5/2016 | Furusawa | B25F 5/026 173/162.2 |
| 2016/0151905 | A1 * | 6/2016 | Tada | B25D 17/043 173/210 |
| 2017/0106518 | A1 * | 4/2017 | Takeuchi | B25F 5/006 |
| 2018/0099391 | A1 | 4/2018 | Umemoto et al. | |
| 2019/0061132 | A1 * | 2/2019 | Mori | B23D 51/16 |
| 2020/0078919 | A1 | 3/2020 | Machida et al. | |

FOREIGN PATENT DOCUMENTS

| | | | |
|---|---|---|---|
| JP | 2015-223690 | A | 12/2015 |
| JP | 2016-93867 | A | 5/2016 |
| JP | 2018-58188 | A | 4/2018 |
| JP | 2019-038093 | A | 3/2019 |
| JP | 2020-040199 | A | 3/2020 |

OTHER PUBLICATIONS

Jan. 9, 2024 Office Action issued in Japanese Application No. 2020-140902.

* cited by examiner

POWER TOOL HAVING HAMMER MECHANISM

CROSS-REFERENCE TO RELATED APPLICATIONS

The present application claims priority to Japanese patent application Nos. 2020-140902 and 2020-140897, both of which were filed on Aug. 24, 2020. The contents of the foregoing applications are hereby fully incorporated herein by reference.

TECHNICAL FIELD

The present disclosure relates to a power tool having a hammer mechanism configured to linearly drive a tool accessory.

BACKGROUND

A known power tool having a hammer mechanism performs a processing operation on a workpiece by linearly driving a tool accessory along a driving axis. In such a power tool, particularly large vibration is generated in an extension direction of the driving axis. To cope with this vibration, various vibration-isolating housing structures have been proposed. For example, Japanese Unexamined Patent Application Publication No. 2015-093867 discloses a rotary hammer that includes a main body, in which a motor and a driving mechanism are housed, and a handle that includes a grip part. The handle is elastically connected to the main body so as to be movable relative to the main body in an extension direction of a driving axis (in a front-rear direction). The rotary hammer further includes a sliding guide structure for guiding relative movement between the handle and the main body.

SUMMARY

The sliding guide structure described above includes multiple guide grooves and multiple small-diameter guide pins that are slidable along the guide grooves. The guide grooves are each formed in an inner surface of a tubular part of the handle to extend in the front-rear direction, and spaced apart from each other and aligned in a circumferential direction. The guide pins are each provided on an outer surface of a tubular motor housing to extend in the front-rear direction, and spaced apart from each other in the circumferential direction. With such a guide structure, looseness may be caused due to dimensional errors of the guide pins and the guide grooves.

An object of the present disclosure is to provide improvement in a guide structure in a power tool having a hammer mechanism that includes a main body and a handle that are elastically connected (coupled) with each other to be movable relative to each other.

One aspect of the present disclosure herein provides a power tool having a hammer mechanism that includes a motor, a driving mechanism, a main housing, a handle housing, a first guide part, and a second guide part.

The motor includes a stator, a rotor, and a motor shaft. The motor shaft extends from the rotor. The motor shaft is rotatable integrally with the rotor around a first axis. The driving mechanism is configured to perform a hammer action of linearly driving a tool accessory along a second axis, using power generated by the motor. The second axis extends parallel to the first axis and defines a front-rear direction of the power tool. The main housing houses the motor and the driving mechanism. The handle housing is formed in an annular shape. The handle housing is connected to the main housing via a first elastic member to be movable relative to the main housing at least in the front-rear direction. The handle housing includes an elongate grip part. The grip part is located behind the main housing, and extends in a direction that crosses (intersects) the second axis.

The first guide part and the second guide part are configured to guide relative sliding between the main housing and the handle housing in the front-rear direction. Each of the first guide part and the second guide part includes a first engagement part and a second engagement part that are engaged with each other to be slidable in the front-rear direction relative to each other. The main housing has the first engagement part. The handle housing has the second engagement part. The second guide part is spaced apart from the first guide part and located rearward of the first guide part in the front-rear direction. The first engagement part of the first guide part and the first engagement part of the second guide part may have the same structure or may have different structures. Also, the second engagement part of the first guide part and the second engagement part of the second guide part may have the same structure or may have different structures.

The power tool according to the present aspect includes the first guide part and the second guide part that are spaced apart from each other in the front-rear direction and that are configured to guide the relative sliding between the main housing and the handle housing in the front-rear direction. Such a guide structure can stably and precisely guide the sliding between the main housing and the handle housing in the front-rear direction, compared to a structure in which multiple guide parts are aligned in a circumferential direction of the main housing and the handle housing.

DETAILED DESCRIPTION OF THE EMBODIMENTS

Figure 1:
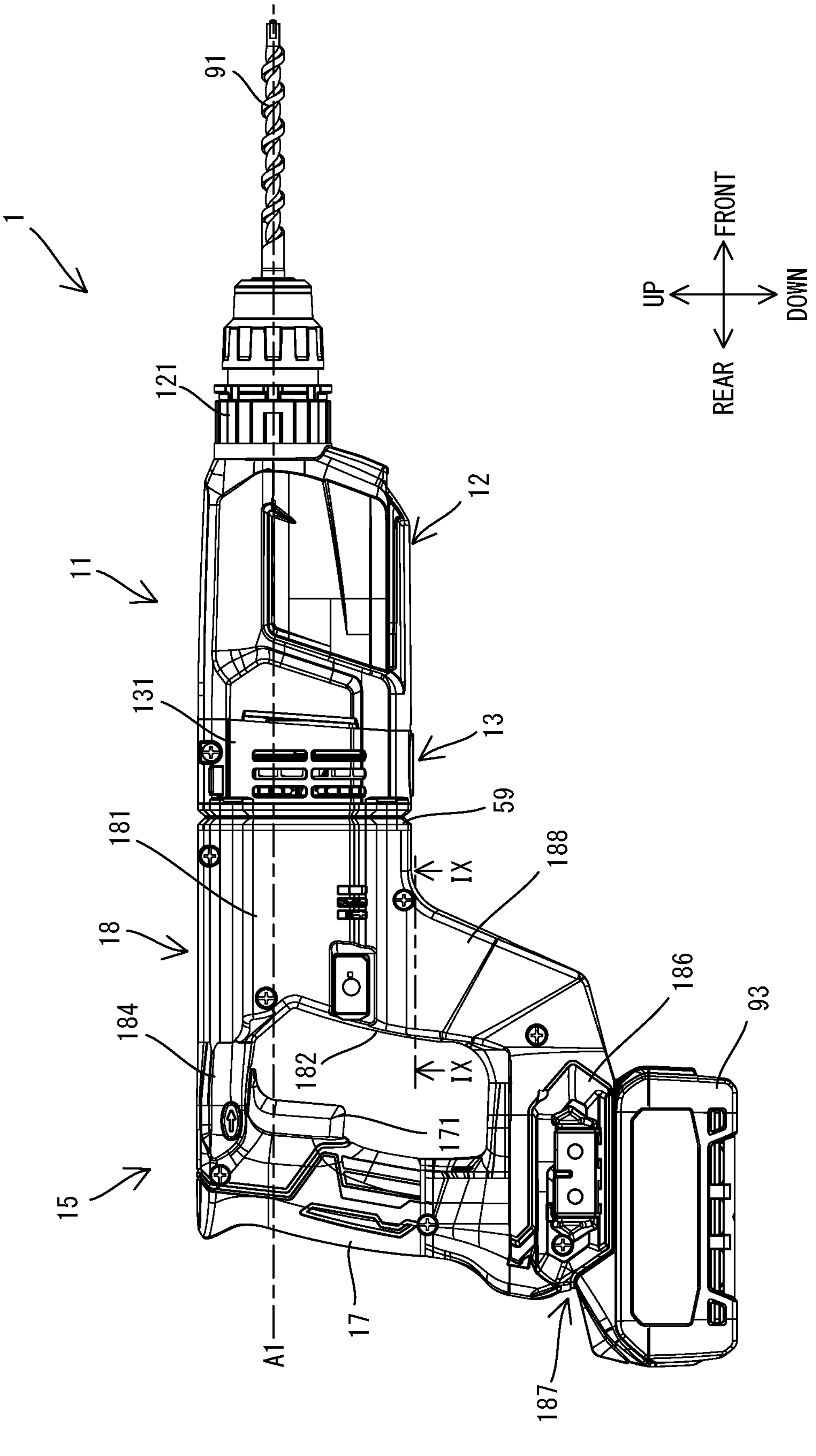
FIG. 1 is a right side view of a rotary hammer.

In one or more embodiments of the present disclosure, at least one of the first guide part and the second guide part may be located rearward of a rear end of the stator of the motor. With this structure, the sliding between the main housing and the handle housing can be guided at a position that is relatively close to the grip part, so that operability (maneuverability) can be improved.

In one or more embodiments of the present disclosure, the first guide part may be located radially outward of the stator. With this structure, the first guide part, which is disposed frontward of the second guide part, can be disposed in the vicinity of the motor, which is a heavy component, and therefore the sliding between the main housing and the handle housing can be more stably guided.

In one or more embodiments of the present disclosure, a direction that is orthogonal to the second axis and that corresponds to an extension direction of the grip part may define an up-down direction of the power tool. The main housing may include a stator housing part and a first extending part. The stator housing part may house the stator. The first extending part may be located above the first axis and extend further rearward of the stator housing part. The handle housing may include a cover part and a second extending part. The cover part may surround the stator housing part at least partially in a circumferential direction around the first axis. The second extending part may extend frontward from an upper end portion of the grip part to be connected to the cover part and cover at least a portion of the first extending part. A portion of the first extending part that projects into the second extending part may have the first engagement part of the second guide part. Further, the second engagement part of the second guide part may be disposed inside the second extending part. Thus, the main housing of the present aspect includes the first extending part that extends further rearward of the stator housing part and projects into the second extending part of the handle housing. Further, the second guide part, which is located rearward of the first guide part, is disposed inside the second extending part. In this way, by purposely extending a portion of the main housing rearward, the sliding between the main housing and the handle housing can be guided at a position that is closer to the grip part. Consequently, the operability (maneuverability) can be further improved.

In one or more embodiments of the present disclosure, a direction that is orthogonal to the second axis and that corresponds to an extension direction of the grip part may define as an up-down direction of the power tool, and a direction that is orthogonal to both of the front-rear direction and the up-down direction may define as a left-right direction of the power tool. The power tool may further include a restricting part that is configured to restrict relative movement between the main housing and the handle housing in the left-right direction. The restricting part may include a first contact part and a second contact part that are configured to make contact with each other. The main housing may have the first contact part and the handle housing may have the second contact part. The first guide part and the second guide part may be located above the first axis in the up-down direction. The restricting part may be located below the first axis in the up-down direction. With this structure, the restricting part can effectively restrict relative rotation of the main housing and the handle housing around an axis that passes through the first guide part and the second guide part, so that looseness can be suppressed.

In one or more embodiments of the present disclosure, one of the first contact part and the second contact part may be biased toward and in slidable contact with the other one of the first contact part and the second contact part. With this structure, the looseness can be further effectively suppressed. Further, the sliding between the main housing and the handle housing can be further stably guided at three portions by the first guide part, the second guide part, and the restricting part.

In one or more embodiments of the present disclosure, the restricting part may be located between the first guide part and the second guide part in the front-rear direction. With this structure, the looseness can be effectively suppressed.

In one or more embodiments of the present disclosure, the main housing may include a stator housing part and a third extending part. The stator housing part may house the stator. The third extending part may be located below the first axis. The third extending part may extend further rearward of the stator housing part and project into the handle housing. The third extending part may have the first contact part. The third extending part may be configured to guide an electric wire extending from the motor. With this structure, the third extending part can be reasonably utilized to suppress the looseness and to guide the electric wire extending from the motor into the handle housing.

In one or more embodiments of the present disclosure, the first contact part and the second contact part of the restricting part may be in slidable contact with each other. Further, the first elastic member may be located below the first guide part and the second guide part and above the restricting part in the up-down direction. With this structure, the sliding between the main housing and the handle housing can be further stably guided at at least two different positions in the up-down direction by the first guide part, the second guide part, and the restricting part. Further, the main housing and the handle housing can be elastically connected (coupled) and also can be guided during the sliding in a well-balanced manner in the up-down direction.

In one or more embodiments of the present disclosure, at least one of the first engagement part and the second engagement part may include a metal part that is slidable along the other one of the first engagement part and the second engagement part. With this structure, the first engagement part and the second engagement part can smoothly slide along each other.

In one or more embodiments of the present disclosure, the power tool may further include a movable member, a detector and a control device. The movable member may be disposed in/on a first one of the main housing and the handle housing, and may be configured to move in response to relative movement of a second one of the main housing and the handle housing in the front-rear direction. The detector may be disposed in/on the first one of the main housing and the handle housing in/on which the movable member is disposed, and may be configured to detect pressing of the tool accessory against a workpiece by detecting movement of the movable member. The control device may be configured to control driving of the motor based on a detection result of the detector. The movable member and the detector may be located between the first guide part and the second guide part in the front-rear direction.

When the tool accessory is pressed against the workpiece, the handle housing, which is elastically connected to the main housing, moves forward relative to the main housing. Thus, the transition from a no-load state to a loaded state corresponds to the relative forward movement of the handle housing. In the power tool according to the present aspect, relative movement of the other one of the main housing and the handle housing in the front-rear direction corresponds to movement of the movable member. Therefore, the detector can appropriately detect the pressing of the tool accessory against the workpiece (the transition from the no-load state to the loaded state) through the movement of the movable member. The control device can thus control driving of the motor based on the detection result of the detector, depending on whether the tool accessory is in the no-load state or in the loaded state. Further, since the movable member and the detector are disposed at positions where the main housing and the handle housing stably move relative to each other, detection accuracy can be improved.

A non-limiting, representative embodiment of the present disclosure will be described below, with reference to the drawings. In the embodiment, a handheld rotary hammer 1 is exemplarily described. The rotary hammer 1 is one example of a power tool having a hammer mechanism, and is also one example of a drilling tool. The rotary hammer 1 is configured to linearly drive a tool accessory 91 along a predetermined driving axis A1 (this action of the rotary hammer 1 is hereinafter referred to as hammer action). The rotary hammer 1 is also configured to rotationally drive the tool accessory 91 around the driving axis A1 (this action of the rotary hammer 1 is hereinafter referred to as drilling action).

Figure 2:
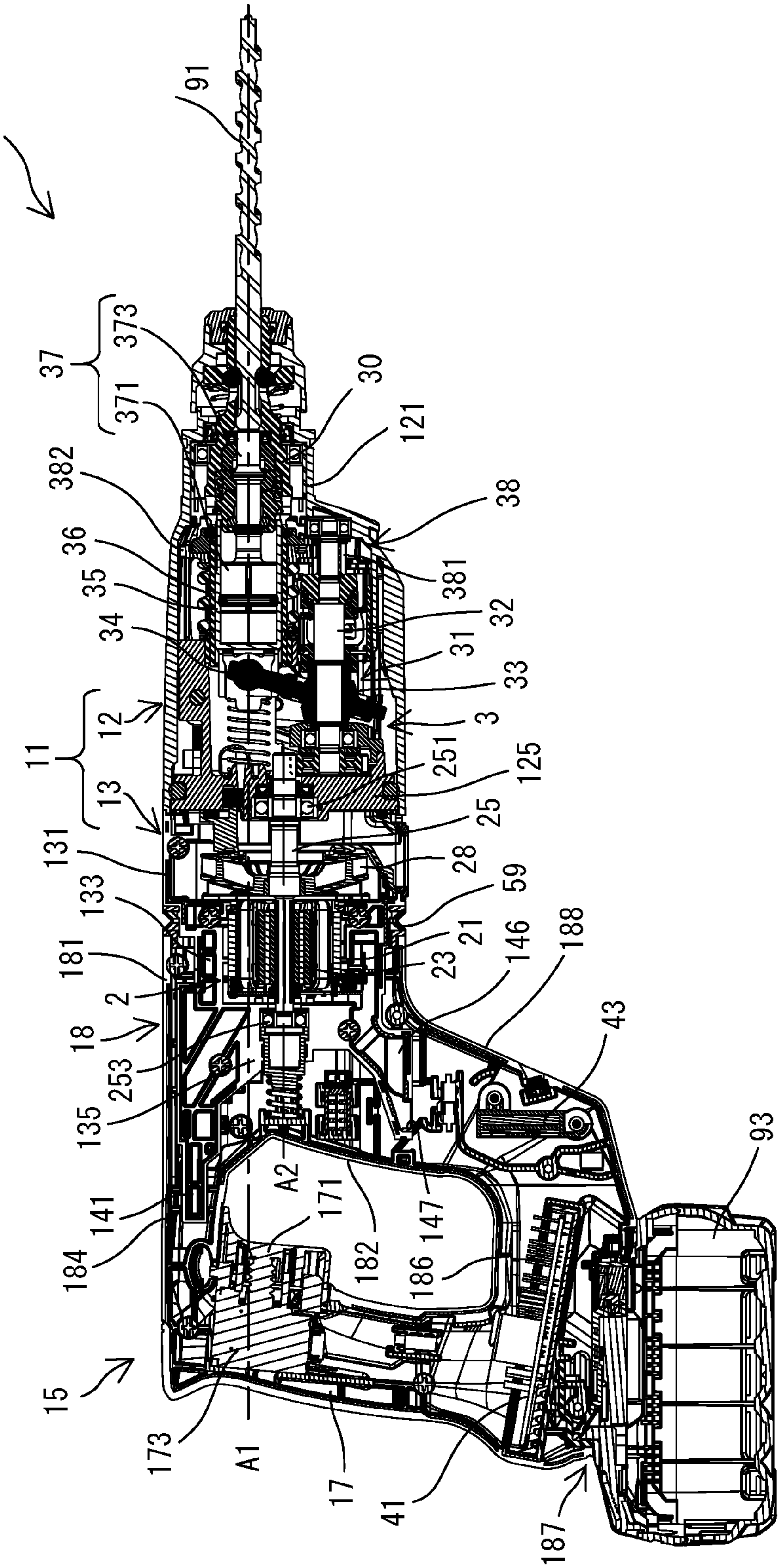
FIG. 2 is a cross-sectional view of the rotary hammer.

A general structure of the rotary hammer 1 is first described. As shown in FIG. 1 and FIG. 2, an outer shell of the rotary hammer 1 is mainly formed by a main housing 11 and a handle housing 15. In the present embodiment, each of the main housing 11 and the handle housing 15 is formed of synthetic resin (polymer, plastic).

The main housing 11 is an elongate hollow body that extends along the driving axis A1. A tool holder 30 (see FIG. 2) is disposed in one end portion of the main housing 11 in its longitudinal direction. A tool accessory 91 is removably coupled (detachably attached) to the tool holder 30. A motor 2 and a driving mechanism 3 are housed in the main housing 11.

The handle housing 15 is elastically connected (coupled) to the other end portion of the main housing 11 in its longitudinal direction (i.e., an end portion that is opposite to the end portion in which the tool holder 30 is disposed). The handle housing 15 includes an elongate grip part 17 configured to be gripped by a user. The grip part 17 is spaced apart from the main housing 11 and extends in a direction that intersects (crosses) (specifically, that is generally orthogonal to) the driving axis A1. One end portion of the grip part 17 in its longitudinal direction is disposed on the driving axis A1, and has a trigger 171 configured to be manually depressed by the user. The other end portion of the grip part 17 in its longitudinal direction is spaced apart from the driving axis A1. When an entirety of the handle housing 15 is viewed in a direction that is orthogonal to both of the driving axis A1 and the longitudinal axis of the grip part 17, the handle housing 15 is formed in an annular (ring-like or loop-like) shape (generally D-shape).

When the trigger 171 is pressed by the user, the motor 2 is driven and the driving mechanism 3 performs the hammer action and/or the drilling action.

The detailed structure of the rotary hammer 1 is now described. In the following description, for convenience sake, an extension direction of the driving axis A1 (which is also the longitudinal direction of the main housing 11 or an axial direction of the tool accessory 91) is defined as a front-rear direction of the rotary hammer 1. In the front-rear direction, the side on which the tool accessory 91 is attached (the side on which the tool holder 30 is disposed) is defined as a front side of the rotary hammer 1, and the opposite side (the side on which the grip part 17 is disposed) is defined as a rear side. A direction that is orthogonal to the driving axis A1 and that generally corresponds to the extension direction of the grip part 17 is defined as an up-down direction. In the up-down direction, the side of the one end portion of the grip part 17 on which the trigger 171 is disposed is defined as an upper side, and the opposite side (the side of the other end portion spaced apart from the driving axis A1) is defined as a lower side. A direction that is orthogonal to both of the front-rear direction and the up-down direction is defined as a left-right direction.

Firstly, the main housing 11 and structures (elements) within the main housing 11 are described.

Figure 3:
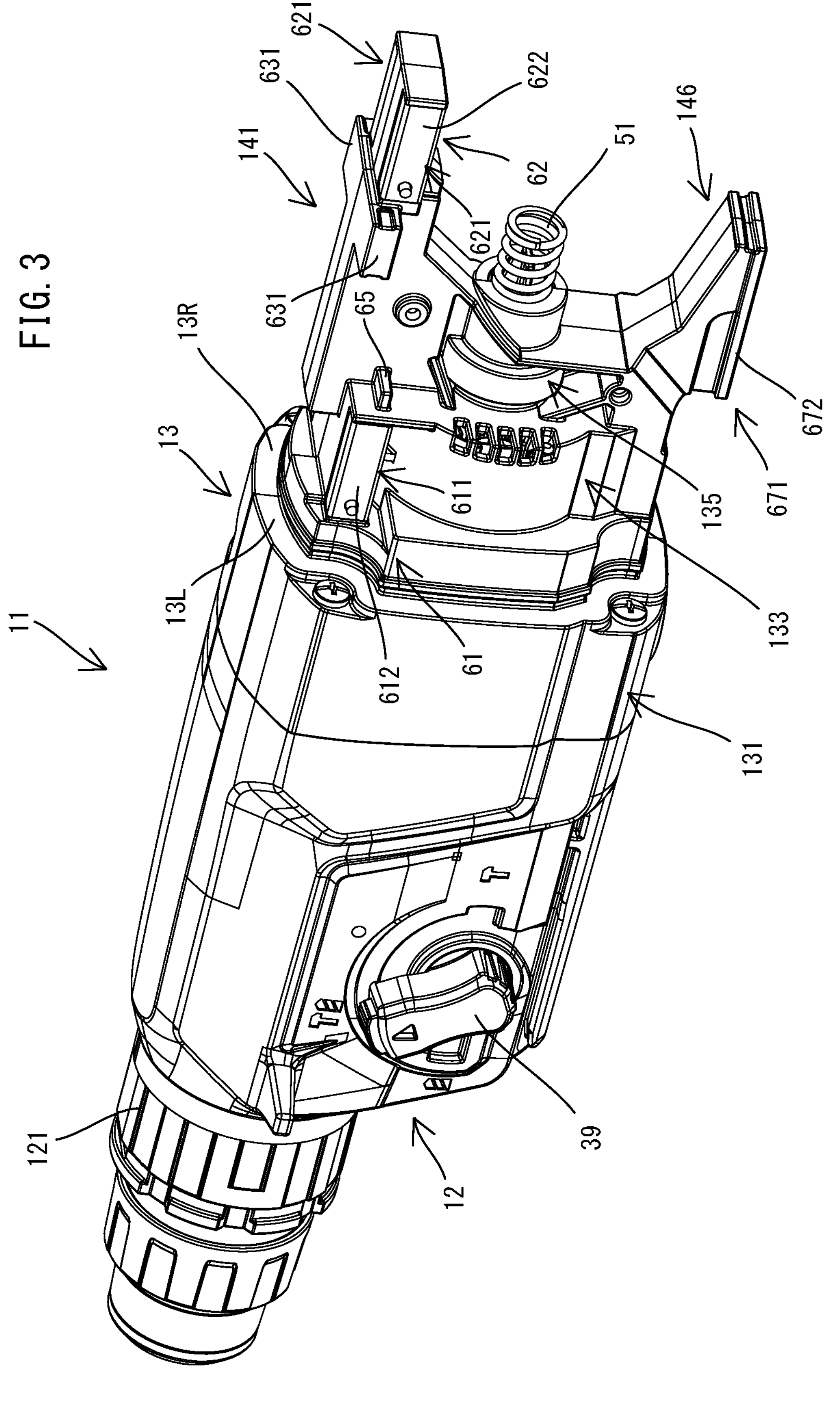
FIG. 3 is a perspective view of a main housing.

As shown in FIG. 2 and FIG. 3, in the present embodiment, the main housing 11 includes a gear housing 12 and a motor housing 13. The gear housing 12 mainly houses the driving mechanism 3. The motor housing 13 mainly houses the motor 2. The gear housing 12 and the motor housing 13, in which various mechanisms are mounted, are connected and fixed to each other in the front-rear direction using screws in a state in which the motor housing 13 is located rearward of the gear housing 12. The single main housing 11 is thus formed by fixedly connecting the gear housing 12 and the motor housing 13 such that they are immovable relative to each other.

Next, the gear housing 12 and structures (elements) within the gear housing 12 are described.

As shown in FIG. 2 and FIG. 3, the gear housing 12 as a whole is an elongate tubular body. The gear housing 12 has a hollow cylindrical front end portion (hereinafter, referred to as a barrel part 121). The tool holder 30 is supported in the barrel part 121 to be rotatable around the driving axis A1. A portion of the gear housing 12 extending rearward from the barrel part 121 has a generally rectangular cross-section, and houses the driving mechanism 3. In the present embodiment, the driving mechanism 3 is supported by a metal support member 125 and fixedly held in the gear housing 12.

As shown in FIG. 2, in the present embodiment, the driving mechanism 3 includes a motion-converting mechanism 31, a striking mechanism 37, and a rotation-transmitting mechanism 38.

The motion-converting mechanism 31 is configured to convert rotational motion of the motor shaft 25 of the motor 2 into a linear motion and transmit the linear motion to the striking mechanism 37. In the present embodiment, a motion-converting mechanism 31 includes an intermediate shaft 32, a rotation member 33, an oscillating member 34, and a piston cylinder 35.

The intermediate shaft 32 extends in the front-rear direction in parallel to the motor shaft 25. The intermediate shaft 32 is rotatably supported by two bearings held by the gear housing 12. The rotation member 33 is mounted around the intermediate shaft 32. The oscillating member 34 is operably coupled to the rotation member 33 and configured to be oscillated in the front-rear direction while the rotation member 33 is rotated. The piston cylinder 35 is a bottomed hollow cylinder. The piston cylinder 35 is slidable in the front-rear direction within a hollow cylinder 36. The piston cylinder 35 is reciprocated in the front-rear direction while the oscillating member 34 is oscillated. The cylinder 36 is coaxially connected to a rear end of the tool holder 30 to form a single unit. The tool holder 30 and the cylinder 36 integrated with each other are supported by two bearings, which are held by the gear housing 12, to be rotatable around the driving axis A1.

The striking mechanism 37 is linearly movable and configured to strike the tool accessory 91 (see FIG. 1) to thereby linearly drive the tool accessory 91 along the driving axis A1. In the present embodiment, the striking mechanism 37 includes a striker 371 and an impact bolt 373. The striker 371 is disposed in the piston cylinder 35 to be slidable in the front-rear direction. The impact bolt 373 is disposed in front of the striker 371. An internal space of the piston cylinder 35 formed behind the striker 371 defines an air chamber, which serves as an air spring.

When the motor 2 is driven and the piston cylinder 35 is moved frontward, the air within the air chamber is compressed and its internal pressure increases. Accordingly, the striker 371 is pushed forward at high speed and strikes the impact bolt 37. The impact bolt 37 transmits the kinetic energy of the striker 371 to the tool accessory 91. Thus, the tool accessory 91 is linearly driven along the driving axis A1 and strikes a workpiece. On the other hand, when the piston cylinder 35 is moved rearward, the air within the air chamber expands and its internal pressure decreases, so that the striker 371 moves rearward. The tool accessory 91 moves rearward by being pressed against the workpiece. The motion-converting mechanism 31 and the striking mechanism 37 repeat the actions described above to perform the hammer action.

The rotation-transmitting mechanism 38 is configured to transmit rotation of the motor shaft 25 to the tool holder 30. The rotation-transmitting mechanism 38 is a speed-reducing mechanism including a plurality of gears. Specifically, the rotation-transmitting mechanism 38 includes a first gear 381 and a second gear 382. The first gear 381 is disposed at a front end portion of the intermediate shaft 32. The second gear 382 is disposed around the cylinder 36, and meshes with the first gear 381. When the motor 2 is driven, the cylinder 36 and the tool holder 30 are integrally rotated around the driving axis A1 via the rotation-transmitting mechanism 38. Thus, the tool accessory 91 held by the tool holder 30 is rotationally driven around the driving axis A1. The rotation-transmitting mechanism 38 performs the drilling action as described above.

The rotary hammer 1 of the present embodiment has three action modes, that is, a hammer-drill mode (rotation with hammering), a hammer mode (hammering only), and a drill mode (rotation only). The user can select one of the three action modes by manipulating a mode changing lever 39 (see FIG. 3). In the hammer-drill mode, the motion-converting mechanism 31 and the rotation-transmitting mechanism 38 are both driven, so that both the hammer action and the drilling action are performed. In the hammer mode, transmission of the power in the rotation-transmitting mechanism 38 is interrupted and only the motion-converting mechanism 31 is driven, so that only the hammer action is performed. In the drill mode, the transmission of the power in the motion-converting mechanism 31 is interrupted and only the rotation-transmitting mechanism 38 is driven, so that only the drilling action is performed. A mode changing mechanism, which changes a transmission state of each of the motion-converting mechanism 31 and the rotation-transmitting mechanism 38 in response to the manipulation of the mode changing lever 39, is disposed in the gear housing 12. The structure of the mode changing mechanism is known, and therefore the description thereof is omitted herein.

The motor housing 13 and structures (elements) within the motor housing 13 is now described. As shown in FIG. 2 and FIG. 3, the motor housing 13 as a whole is an elongate hollow body that extends in the front-rear direction. The motor housing 13 houses the motor 2. The motor 2 is a brushless motor that includes a stator 21, a rotor 23, and the motor shaft 25. The motor shaft 25 extends from the rotor 23 and rotates integrally with the rotor 23. The motor 2 is disposed such that a rotational axis A2 of the motor shaft 25 extends in the front-rear direction in parallel to the driving axis A1. A front end portion and a rear end portion of the motor shaft 25 are rotatably supported by bearings 251 and 253, respectively. The front bearing 251 is supported by the above-described support member 125 in the gear housing 12. The rear bearing 253 is supported by the motor housing 13 (specifically, a bearing housing part 135, which will be described below).

In the present embodiment, the motor housing 13 includes left and right halves 13L and 13R that are divided along a plane P (see FIG. 7) containing the driving axis A1 and the rotational axis A2. The two halves 13L and 13R that are fixedly connected with each other in the left-right direction using screws form a single housing, that is, the motor housing 13.

The motor housing 13 includes a connection part 131, a stator housing part 133, and a bearing housing part 135 in this order from the front. The connection part 131 is fixedly connected to the gear housing 12. The connection part 131 has a rectangular cross-section, which conforms to the shape of the gear housing 12. A fan 28, which is fixed to the motor shaft 25, is disposed in the connection part 131. The stator housing part 133 houses the stator 21 of the motor 2. The stator housing part 133 is formed as a hollow cylinder that corresponds to the stator 21. The stator housing part 133 has a smaller diameter than the connection part 131. The bearing housing part 135 houses the bearing 253 that supports the rear end portion of the motor shaft 25. The bearing housing part 135 is formed as a hollow cylinder that corresponds to the bearing 253. The bearing housing part 135 has a smaller diameter than the stator housing part 133.

Figure 4:
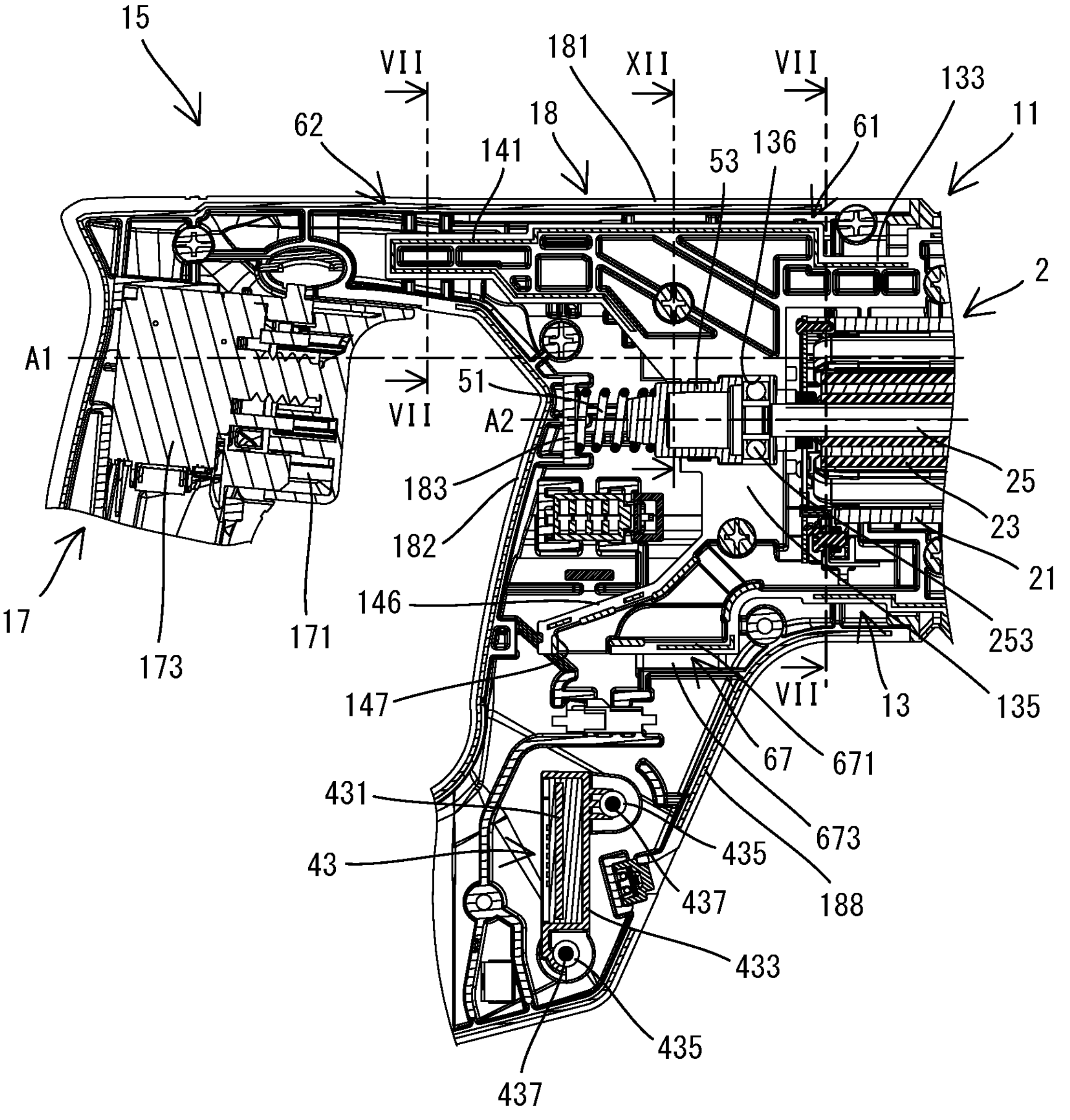
FIG. 4 is a partial enlarged view of FIG. 2.

As shown in FIG. 3 and FIG. 4, the motor housing 13 includes an upper extending part 141 and a lower extending part 146. The upper extending part 141 and the lower extending part 146 project rearward from the stator housing part 133, and extend in the front-rear direction above and below the bearing housing part 135, respectively. Rear ends of the upper extending part 141 and the lower extending part 146 are both located rearward of a rear end of the bearing housing part 135. The rear end of the upper extending part 141 is located rearward of the rear end of the lower extending part 146. An internal space of the lower extending part 146 communicates (is continuous) with an internal space of the stator housing part 133.

The upper extending part 141 mainly serves to guide relative movement between the main housing 11 and the handle housing 15 in the front-rear direction, as will be described in detail below. The lower extending part 146 mainly serves to restrict relative rotation between the main housing 11 and the handle housing 15. Further, the lower extending part 146 defines a passage through which electric wires (not shown) connected to the motor 2 extend. An opening 147 is formed in a lower wall of a rear end portion of the lower extending part 146. The electric wires are led into the handle housing 15 (specifically, into a front extending part 188 described below) through the opening 147.

Of the motor housing 13 having the above-described structures, the connection part 131 is fixed to the gear housing 12, and exposed outside the handle housing 15. The most part of the stator housing part 133, the bearing housing part 135, the upper extending part 141, and the lower extending part 146 are within the handle housing 15 (specifically, within a base part 18).

The handle housing 15 and structures (elements) within the handle housing 15 are now described.

Figure 5:
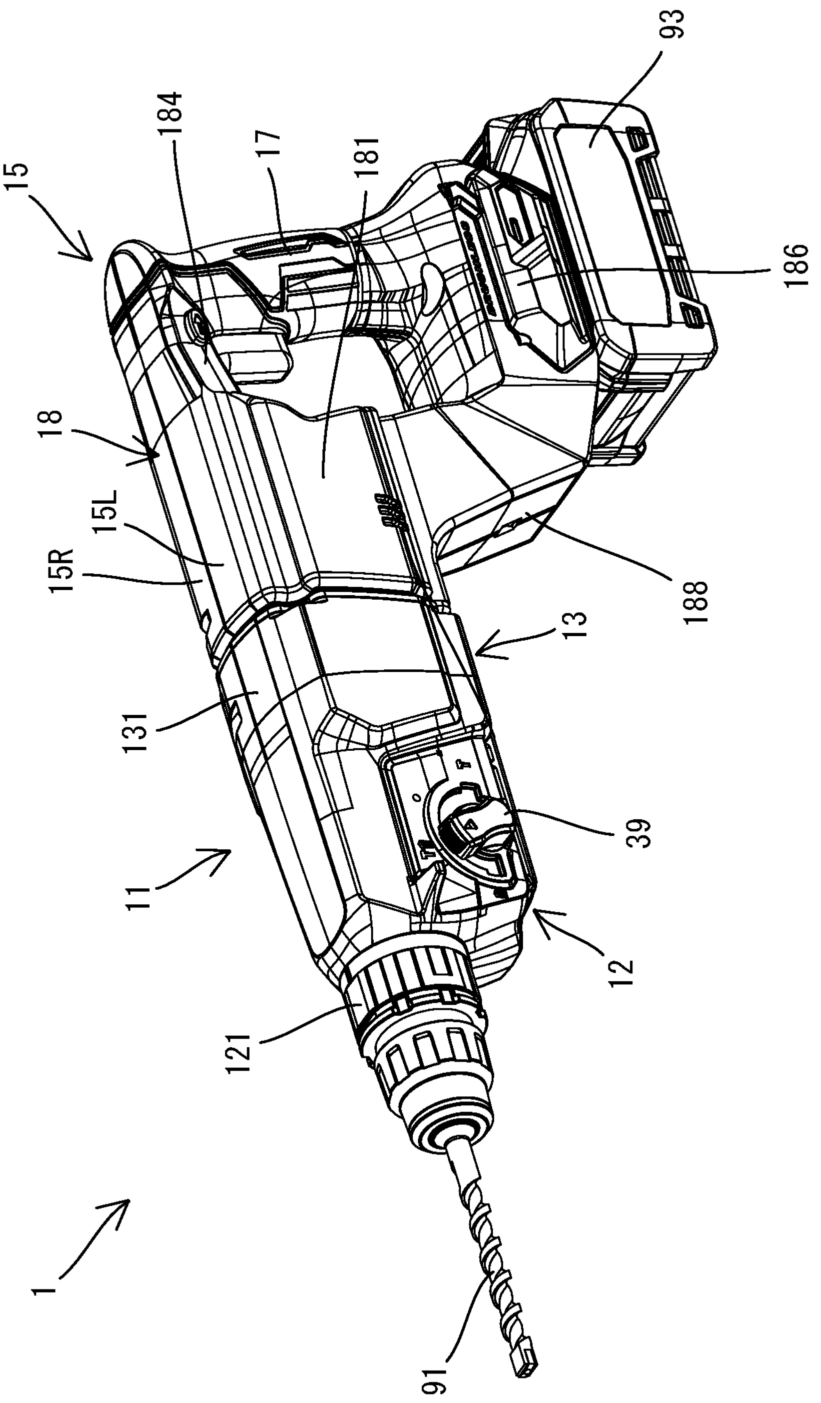
FIG. 5 is a perspective view of the rotary hammer.

As shown in FIG. 5, similar to the motor housing 13, the handle housing 15 includes left and right halves 15L and 15R that are divided along the plane P (see FIG. 7) containing the driving axis A1 and the rotational axis A2. The two halves 15L and 15R that are fixedly connected with each other in the left-right direction using screws from a single housing, that is, the handle housing 15.

As shown in FIG. 1 and FIG. 2, the handle housing 15 includes the grip part 17 and the base part 18.

As described above, the grip part 17 generally extends in the up-down direction behind the rear end of the main housing 11, with a space therebetween in the front-rear direction. The trigger 171 is disposed at a front side of the upper end portion of the grip part 17. The upper end portion of the grip part 17 and the trigger 171 are located on the driving axis A1. A switch 173 is housed in the grip part 17, adjacent to the trigger 171. The switch 173 is normally held OFF and is turned ON when the trigger 171 is depressed by the user. The switch 173 is connected to a controller 41 via electric wires (not shown). The switch 173 selectively outputs a signal that corresponds to ON or OFF to the controller 41.

The base part 18 connects the grip part 17 and the main housing 11 so as to form an annular portion (a ring or a loop) together with the grip part 17. The base part 18 includes a cover part 181, an upper extending part 184, a lower extending part 186, and the front extending part 188.

The cover part 181 extends in the front-rear direction, and surrounds a portion of the main housing 11 in a circumferential direction around the driving axis A1. The cover part 181 has a bottomed rectangular box-like shape. More specifically, a front end of the cover part 181 is open, and a rear end of the cover part 181 is closed by a rear wall 182. The cover part 181 has a cross-section that generally matches those of the gear housing 12 and the connection part 131 of the motor housing 13. The cover part 181 is behind the connection part 131 of the motor housing 13. The cover part 181 houses a portion of the stator housing part 133, the bearing housing part 135, a portion of the upper extending part 141, and a portion of the lower extending part 146 of the motor housing 13.

As shown in FIG. 2, an annular bellows part 59 is interposed between the front end of the cover part 181 and the rear end of the connection part 131 of the motor housing 13. The bellows part 59 is contractable and expandable in the front-rear direction. The bellows part 59 is contracted or expanded in response to movement of the handle housing 15 relative to the main housing 11 in the front-rear direction and prevents dust or the like from entering a gap between the main housing 11 and the handle housing 15.

Figure 6:
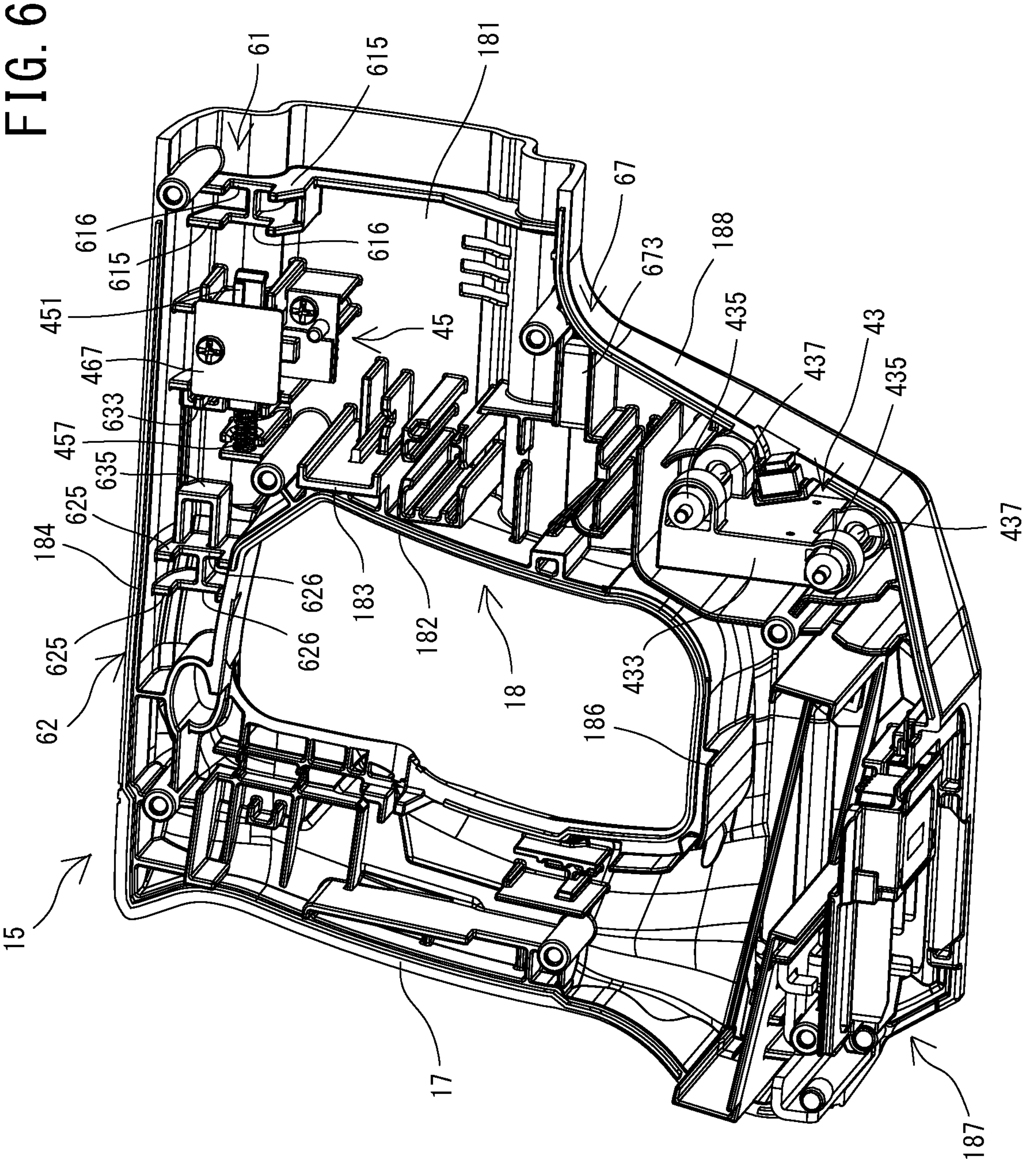
FIG. 6 is a perspective view of a handle housing wherein a right half of the handle housing is removed.

As shown in FIG. 6, a position detection mechanism 45 is disposed in the cover part 181. The position detection mechanism 45 is configured to detect a position of the handle housing 15 relative to the main housing 11 in the front-rear direction. The position detection mechanism 45 will be described in detail below.

As shown in FIG. 1 and FIG. 2, the upper extending part 184 projects rearward from an upper rear end portion of the cover part 181 to be connected to the upper end portion of the grip part 17. The upper extending part 184 has a tubular shape. An internal space of the upper extending part 184 communicates (is continuous) with an internal space of the cover part 181 via an opening formed in the rear wall 182. The internal space of the upper extending part 184 also communicates (is continuous) with an internal space of the grip part 17. The rear end portion of the upper extending part 141 of the motor housing 13 projects into the upper extending part 184.

The lower extending part 186 projects frontward from the lower end portion of the grip part 17. The lower extending part 186 has a rectangular box-like shape. An internal space of the lower extending part 186 communicates (is continuous) with the internal space of the grip part 17.

The controller 41 is housed in the lower extending part 186. Although not shown in detail, the controller 41 includes a control circuit, a three-phase inverter, and a circuit board on which the control circuit and the three-phase inverter are mounted. The control circuit is structured as a microcomputer that includes a CPU, a ROM, a RAM, a timer, and the like. The control circuit drives the motor 2 via the three-phase inverter. In the present embodiment, the controller 41 (control circuit) is configured to control driving of the motor 2 based on the ON/OFF state of the switch 173 and detection results of various sensors, as will be described in detail below.

A battery-mounting part 187 is disposed in the lower end portion of the lower extending part 186. A battery 93 is removably mounted (detachably attached) to the battery-mounting part 187. The battery 93 is a rechargeable power source for supplying electric power to the motor 2, the controller 41 and the like. The battery 93 may also be called a battery pack. The battery-mounting part 187 includes rails that are slidably engageable with guide grooves of the battery 93, and terminals that are electrically connectable to terminals of the battery 93. The structures of the battery 93 and the battery-mounting part 187 are well-known, and therefore the specific description and illustration thereof are omitted herein. The battery-mounting part 187 is connected to the controller 41 via electric wires that are not shown. Both of the battery-mounting part 187 and the controller 41 are located in the lower extending part 186 to be adjacent to each other, which facilitates wiring between the battery-mounting part 187 and the controller 41.

The front extending part 188 connects the lower extending part 186 and the cover part 181. The front extending part 188 has a tubular shape. The front extending part 188 extends generally upward from the front end portion of the lower extending part 186 to be connected to the rear lower end portion of the cover part 181. An internal space of the front extending part 188 communicates (is continuous) with the internal space of the lower extending part 186 and with the internal space of the cover part 181. The lower end portion of the lower extending part 146 of the motor housing 13 projects into an upper end portion of the front extending part 188.

As shown in FIG. 4 and FIG. 6, an acceleration detection unit 43 is disposed in the front extending part 188. More specifically, the acceleration detection unit 43 is disposed in the lower end portion of the front extending part 188 (i.e., in the lower end portion of the base part 18 that connects the lower end portion of the grip part 17 and the main housing 11).

The structure of the acceleration detection unit 43 is now described. The acceleration detection unit 43 includes a case 433 and a sensor body 431. The case 433 has a rectangular box-like shape. The sensor body 431 is disposed in the case 433 and molded with the case 433 to form a single unit. The sensor body 431 is connected to the controller 41 via electric wires, which are not shown. As described above, the controller 41 is housed in the lower extending part 186 that is connected with the front extending part 188, which facilitates wiring between the sensor body 431 and the controller 41.

Although not shown in detail, the sensor body 431 includes an acceleration sensor, a microcomputer including a CPU, a ROM, a RAM and the like, and a circuit board on which the acceleration sensor and the microcomputer are mounted. The acceleration sensor detects acceleration, which serves as information (or a physical quantity or an index) that corresponds to a rotation state of the handle housing 15 around the driving axis A1 (also, a rotation state of the main housing 11). The acceleration detection unit 43 is disposed directly below the driving axis A1. At this position, rotation of the handle housing 15 and the main housing 11 around the driving axis A1 can be recognized as movement in the left-right direction. Thus, a well-known acceleration sensor that is capable of detecting acceleration in the left-right direction is installed in the sensor body 431. The acceleration detection unit 43 is disposed in the lower end portion of the base part 18 (the front extending part 188), namely, at a position that is substantially farthest from the driving axis A1. Therefore, the acceleration sensor can detect the acceleration in the left-right direction with high accuracy.

The microcomputer of the sensor body 431 determines whether or not the acceleration detected by the acceleration sensor exceeds a predetermined threshold. In a case in which the acceleration exceeds the threshold, the microcomputer outputs a specific signal (hereinafter referred to as an error signal) to the controller 41 (see FIG. 7). The case in which the acceleration exceeds the threshold corresponds to a state of the rotary hammer 1 excessively rotated around the driving axis A1. Such a state may typically occur when the tool holder 30 becomes incapable of rotating (this state of the tool holder 30 may also be referred to as a blocking state) due to jamming or binding of the tool accessory 91 during the drilling action and thus excessive large reaction torque is applied to the handle housing 15 and the main housing 11.

In a different embodiment, the sensor body 431 may not include the microcomputer. In such an embodiment, the sensor body 431 may output the signal that indicates a detection result of the acceleration sensor to the controller 41 and then the controller 43 may execute the determination described above. The control of the rotary hammer 1 based on the signals outputted from the sensor body 431 will be described below.

The acceleration detection sensor 43 is supported in the front extending part 188 via elastic members 435. More specifically, the elastic members 435 are fitted in the case 433 and interposed between the case 433 and a left wall of the front extending part 188 and between the case 433 and a right wall of the front extending part 188. In the present embodiment, two pairs of the elastic members 435 (i.e., a total of four elastic members 435) are employed. One of the two pairs, that is, two of the elastic members 435 are fitted in an upper left side portion and an upper right side portion of the case 433. The other of the two pairs, that is, the other two of the elastic members 435 are fitted in a lower left side portion and a lower right side portion of the case 433. A pin 437 is inserted into each set of the two elastic members 435. Both ends of the pin 437 are supported by the left and right walls of the front extending part 188 so that the pin 437 extends in the left-right direction within the front extending part 188. With such an elastic support structure, the acceleration detection unit 43 is supported to be movable in all directions, including the front-rear direction, the up-down direction, and the left-right direction, relative to the handle housing 15.

As described above, in the present embodiment, the acceleration detection unit 43 is housed in the base part 18 (specifically, in the front extending part 188) that connects the main housing 11 and the lower end portion of the grip part 17, which is spaced away from the driving axis A1 (namely, one end portion that is farther away from the main housing 11 than the other end portion) among the two end portions of the grip part 17. Thus, a reasonable arrangement of the acceleration detection unit 43 is achieved while preventing a size increase of the rotary hammer 1 as a whole in the extension direction of the driving axis A1 (i.e., in the front-rear direction) or in a direction that intersects the driving axis A1.

Further, as described above, since the acceleration detection unit 43 is supported via the elastic members 435, the acceleration sensor, which is a precision device, can be effectively protected from vibration.

In the present embodiment, the handle housing 15 is elastically connected (coupled) to the main housing 11, and is movable in the front-rear direction relative to the main housing 11. The elastic connecting structure between the main housing 11 and the handle housing 15 is now described.

As shown in FIG. 4, an elastic member 51 is interposed between the main housing 11 and the handle housing 15 in the front-rear direction. The elastic member 51 biases the main housing 11 and the handle housing 15 away from each other. Specifically, the elastic member 51 biases the main housing 11 forward and the handle housing 15 rearward. A compression coil spring is employed as the elastic member 51.

More specifically, the elastic member 51 is disposed between the rear end portion (specifically, the bearing 253) of the motor shaft 25 that is supported by the main housing 11 and a support wall 183 that is provided in front of the rear wall 182 of the handle housing 15. As described above, the bearing housing part 135 of the motor housing 13 is shaped like a hollow cylinder, and has a through hole 136 that extends in the front-rear direction along the rotational axis A2. The bearing (specifically, a ball bearing) 253 that supports the rear end portion of the motor shaft 25 is fitted in the through hole 136. A spring receiving member 53 is disposed behind the bearing 253. A front portion of the spring receiving member 53 is fitted in the through hole 136 and a rear portion of the spring receiving member 53 projects rearward from the through hole 136. A front end of the spring receiving member 53 is in contact with (abuts on) the rear end of the bearing 253 (specifically, with an outer ring of the ball bearing). One end portion of the elastic member 51 is fitted around the rear end portion of the spring receiving member 53, and the other end portion of the elastic member 51 is in contact with (abuts on) the front end surface of the support wall 183.

With such an arrangement, the elastic member 51 biases the main housing 11 forward via the spring receiving member 53, the bearing 253, and the motor shaft 25, and also biases the handle housing 15 rearward via the support wall 183.

Further, the rotary hammer 1 includes a guide structure for guiding the movement of the handle housing 15 relative to the main housing 11 in the front-rear direction. The guide structure is now described.

Figure 7:
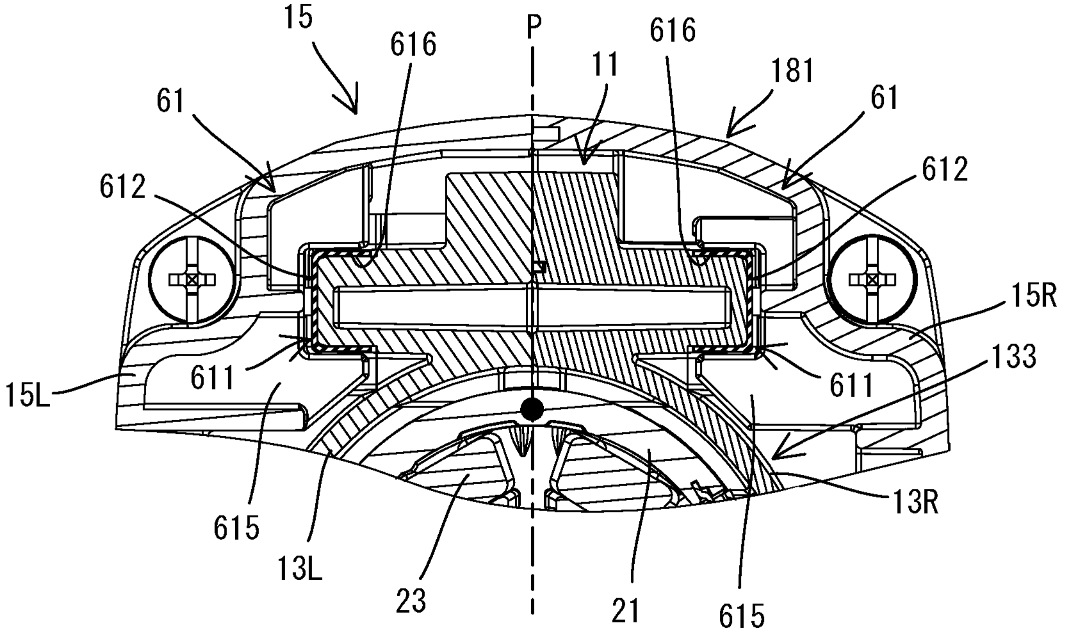
FIG. 7 is a cross-sectional view taken along line VII-VII in FIG. 4.
Figure 8:
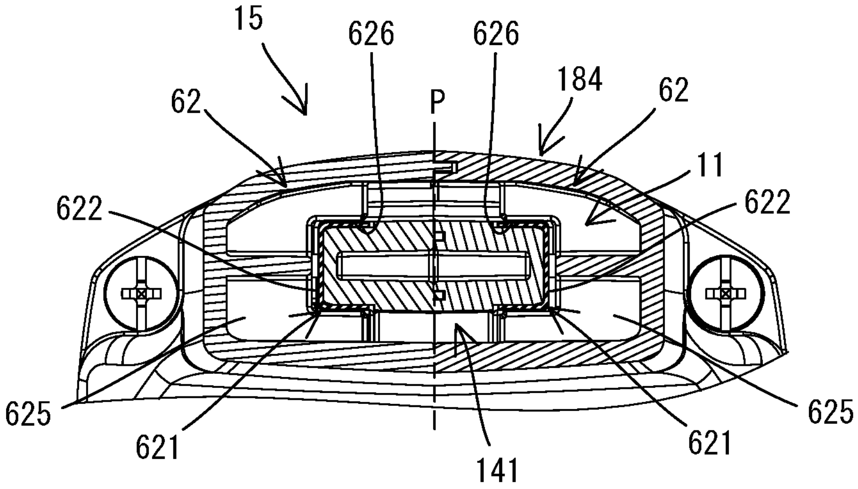
FIG. 8 is a cross-sectional view taken along line VIII-VIII in FIG. 4.

In the present embodiment, as shown in FIG. 4, FIG. 7, and FIG. 8, the rotary hammer 1 includes a pair of (two) front guide parts 61 and a pair of (two) rear guide parts 62 that are spaced apart from each other in the front-rear direction. The two front guide parts 61 are arranged in left-right symmetry (symmetric relative to the plane P). Each front guide part 61 includes a set of engagement parts that are respectively provided to the main housing 11 and the handle housing 15 and that are engaged with each other to be slidable in the front-rear direction. Similarly, the two rear guide parts 62 are arranged in left-right symmetry (symmetric relative to the plane P). Each rear guide part 62 includes a set of engagement parts that are respectively provided to the main housing 11 and the handle housing 15 and that are engaged with each other to be slidable in the front-rear direction. In the present embodiment, the front guide part 61 and the rear guide part 62 have substantially the same configuration. The detailed structures of the front guide part 61 and the rear guide part 62 are now described.

As shown in FIG. 3, FIG. 6, and FIG. 7, each of the two front guide parts 61 includes a guide projection 611, and recesses 616 that are formed in two guide walls 615.

The guide projections 611 are provided on an upper end portion of the stator housing part 133 of the motor housing 13 (i.e., above the stator 21). One of the guide projections 611 projects leftward toward a left wall of the handle housing 15, and the other guide projection 611 projects rightward toward a right wall of the handle housing 15. The guide projection 611 has a parallelepiped shape that is elongate in the front-rear direction. Outer surfaces of the guide projection 611 are covered by a metal cover plate 612.

The two guide walls 615 are provided in an upper front end portion of the cover part 181 of the handle housing 15. Each of the guide walls 615 projects inward (i.e., toward the plane P) from the side wall of the cover part 181. The two guide walls 615 each have the recess 616, whose shape generally matches a sectional shape of the guide projection 611. The two guide walls 615 are spaced apart from each other in the front-rear direction such that the two recesses 616 are aligned on a straight line extending in the front-rear direction. The guide projection 611 is partially disposed in the recesses 616 of the two guide walls 615 so as to be slidable in the front-rear direction.

Similarly, as shown in FIG. 3, FIG. 6, and FIG. 8, each of the two rear guide parts 62 includes a guide projection 621, and recesses 626 that are formed in two guide walls 625.

The guide projections 621 are provided on a rear end portion of the upper extending part 141 of the motor housing 13. One of the guide projections 621 projects leftward toward the left wall of the handle housing 15, and the other guide projection 621 projects rightward toward the right wall of the handle housing 15. The two guide walls 625 are provided in the upper extending part 184 of the handle housing 15 and spaced apart from each other in the front-rear direction. The guide projection 621 and the guide wall 625 have substantially the same structures as the guide projection 611 and the guide wall 615, respectively. Specifically, the guide projection 621 has a substantially parallelepiped shape, and outer surfaces of the guide projection 621 is covered by a metal cover plate 622. The cover plate 622 is the same metal member (a common component (part)) as the cover plate 612 of the guide projection 611. Each of the guide walls 625 projects inward (i.e., toward the plane P) from the side wall of the upper extending part 184 and has the recess 626. The guide projection 621 is partially disposed in the recesses 626 of the two guide walls 625 so as to be slidable in the front-rear direction.

With such a configuration, the main housing 11 (the motor housing 13) and the handle housing 15 are slidably guided in the front-rear direction at two positions that are different in the front-rear direction. As shown in FIG. 4, the front guide parts 61 and the rear guide parts 62 are all located above the rotational axis A2 of the motor shaft 25 in the up-down direction. Further, the rear guide parts 62 are located slightly above the front guide parts 61 in the up-down direction, and a lower end of the rear guide parts 62 is located below an upper end of the front guide parts 61 in the up-down direction. Accordingly, the main housing 11 (the motor housing 13) and the handle housing 15 can be guided at the two positions that are generally the same in the up-down direction and that are spaced apart in the front-rear direction.

Further, the rotary hammer 1 has a structure that defines a rearmost position and a frontmost position of the handle housing 15 within its movable range relative to the main housing 11. More specifically, as shown in FIG. 3 and FIG. 6, left and right stopper projections 631 are provided on the upper extending part 141 of the main housing 11. Correspondingly, left and right stopper walls 633 and left and right stopper walls 635 are disposed in the upper extending part 184 of the handle housing 15 (only the left stopper walls 633 and 635 are shown). The stopper projections 631 and the stopper walls 633 and 635 are all located between the front guide parts 61 and the rear guide parts 62 in the front-rear direction.

One of the stopper projections 631 projects leftward toward the left wall of the handle housing 15, and the other stopper projection 631 projects rightward toward the right wall of the handle housing 15. Each of the stopper walls 633 and 635 projects inward (i.e., toward the plane P, see FIG. 7) from the side wall of the upper extending part 184. The stopper wall 635 is disposed behind the stopper wall 633 to be spaced away from the stopper wall 633. A distance between the stopper wall 635 and the stopper wall 633 in the front-rear direction is larger than a length of the stopper projection 631 in the front-rear direction.

The stopper projection 631 is disposed between the stopper wall 633 and the stopper wall 635 in the front-rear direction. The stopper projection 631 and the stopper wall 633 define the rearmost position of the handle housing 15 by making contact with (abutting against) each other. A front surface of the stopper projection 631 and a rear surface of the stopper wall 633 serve as contact surfaces that are contactable with each other. The stopper projection 631 and the stopper wall 635 define the frontmost position of the handle housing 15 by making contact with (abutting against) each other. A rear surface of the stopper projection 631 and a front surface of the stopper wall 635 serve as contact surfaces that are contactable with each other.

As described above, the handle housing 15 is always biased rearward relative to the main housing 11 by the elastic member 51. Therefore, the handle housing 15 is held at (in) the rearmost position (also referred to as an initial position) where the rear surface of the stopper wall 633 is in contact with the front surface of the stopper projection 631. The position shown in FIG. 2 corresponds to the rearmost position (the initial position) of the handle housing 15.

While the hammer action is being performed, the tool accessory 91 is linearly driven along the driving axis A1, so that relatively large vibration in the front-rear direction is generated in the main housing 11. In response to this vibration, the main housing 11 and the handle housing 15 that are connected with each other via the elastic member 51 move relative to each other in the front-rear direction while sliding relative to each other at the front guide parts 61 and the rear guide parts 62. Consequently, vibration in the front-rear direction transmitted to the handle housing 15 can be effectively reduced.

The front guide part 61 and the rear guide part 62 that are spaced apart from each other in the front-rear direction of the present embodiment can improve the dimensional accuracy, compared to a structure in which multiple guide parts are spaced apart in a circumferential direction of the main housing 11 and the handle housing 15. Therefore, relative sliding movement of the main housing 11 and the handle housing 15 can be stably and precisely guided in the front-rear direction.

In the present embodiment, in particular, each of the front guide parts 61 is disposed radially outward of the stator 21 (more specifically, above the stator 21) in the cover part 181. Thus, each of the front guide parts 61 is in the vicinity of the stator 21 and the rotor 23, which are heavy components, so that the main housing 11 and the handle housing 15 can stably slide relative to each other. Further, each of the rear guide parts 62 is disposed in the upper extending part 184 of the handle housing 15, that is, in a portion extending in the front-rear direction between the stator housing part 133 and the upper end portion of the grip part 17. Further, the main housing 11 (the motor housing 13) is provided with the upper extending part 141 that extends into the upper extending part 184 for the purpose of providing the rear guide parts 62, despite the fact that the upper extending part 141 does not house any specific elements (parts) therein. In this manner, a portion of the main housing 11 is purposely elongated rearward, so that the main housing 11 and the handle housing 15 can be guided at a position that is closer to the grip part 17. Consequently, operability (maneuverability) can be improved.

Further, in the present embodiment, the parallelepiped guide projections 611 and 621 and the two rectangular recesses 616 and 626 are respectively engaged and slide relative to each other in the front-rear direction, with three surfaces of each of the guide projections 611 and 621 and three surfaces of each of the recesses 616 and 622 in sliding contact with each other. Consequently, especially stable sliding can be achieved. The portions including the sliding surfaces of the guide projections 611 and 621 are formed by the metal cover plates 612 and 622, respectively. Thus, the guide projections 611 and 612 can smoothly slide in the recesses 616 and 626, respectively. Further, in the present embodiment, each of the guide walls 615 and 625 is formed of a material that is other than metal (specifically, synthetic resin (polymer, plastic)). Therefore, welding between the guide projections 611 and 621 and the recesses 616 and 626 during sliding can be prevented, and therefore especially smooth sliding can be achieved.

Figure 9:
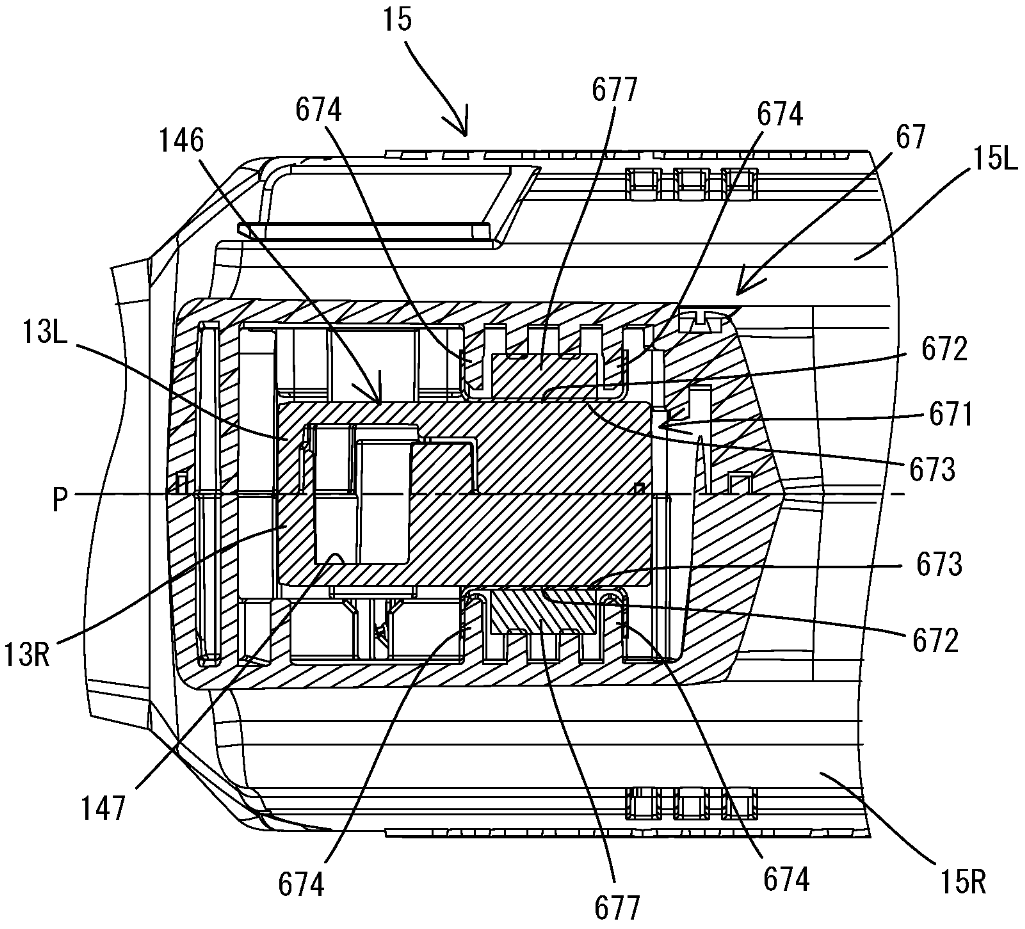
FIG. 9 is a cross-sectional view taken along line IX-IX in FIG. 1.

Further, as shown in FIG. 4 and FIG. 9, in the present embodiment, the rotary hammer 1 includes a restricting part 67, in addition to the front guide parts 61 and the rear guide parts 62. The restricting part 67 is configured to restrict the relative movement in the left-right direction between the main housing 11 and the handle housing 15, at a position that is below the rotational axis A2 of the motor shaft 25 and that is relatively far from the front guide parts 61 and the rear guide parts 62. The restricting part 67 is located between the front guide parts 61 and the rear guide parts 62 in the front-rear direction.

As shown in FIG. 3, FIG. 6, and FIG. 9, the restricting part 67 includes a set of contact parts provided to the main housing 11 and the handle housing 15, respectively. The contact parts restrict the movement of the handle housing 15 relative to the main housing 11 in the left-right direction by making contact with each other. More specifically, the restricting part 67 includes a contact part 671 included in the lower extending part 146 of the main housing 11, and a pair of (two) contact plates 673.

The contact part 671 is a portion of the lower extending part 146 that projects into the upper end portion of the front extending part 188 of the handle housing 15. A left-side surface and a right-side surface of the contact part 671 serve as contact surfaces 672.

The two contact plates 673 are disposed in the upper end portion of the front extending part 188 of the handle housing 15. Each of the contact plates 673 is formed by a thin metal rectangular plate with two opposite end portions bent in the same direction. The contact plates 673 are flexible. Each of the left wall and the right wall of the front extending part 188 has two projections 674. The two end portions of each contact plate 673 are fitted over the two projections 674, so that the contact plate 673 is supported by the projections 674 while slight deformation of the contact plate 673 in the left-right direction is allowed. Elastic members 677 are interposed between the left contact plate 673 and the left wall of the front extending part 188, and between the right contact plate 673 and the right wall of the front extending part 188, respectively. In the present embodiment, a synthetic resin (polymer, plastic) foam (so-called sponge) having a parallelepiped shape is employed as the elastic member 677. The contact plates 673 are always biased toward the contact part 671 by the elastic members 677, and held in contact with the contact surfaces 672, respectively.

With the above-described configuration, the restricting part 67 is capable of restricting movement of the handle housing 15 relative to the main housing 11 in the left-right direction. Thus, the restricting part 67 can effectively restrict relative rotation between the main housing 11 and the handle housing 15 around an axis that passes through the front guide part 61 and the rear guide part 62, to thereby suppress looseness therebetween.

Further, the contact plates 673 are slidable along the corresponding contact surfaces 672, and therefore the restricting part 67 also functions as a guide part that guides sliding movement of the handle housing 15 relative to the main housing 11 in the front-rear direction. Thus, in the present embodiment, a total of three guide parts can stably guide the sliding movement between the main housing 11 and the handle housing 15. In particular, as described above, the restricting part 67 is located relatively far from the front guide parts 61 and the rear guide parts 62 in the up-down direction, and is located between the front guide parts 61 and the rear guide parts 62 in the front-rear direction. Therefore, the additional restricting part 67 can effectively suppress the looseness and stably guide the sliding movement.

Further, as described above, the elastic member 51, which biases the main housing 11 and the handle housing 15 away from each other, is located on the rotational axis A2 of the motor shaft 25. Thus, the elastic member 51 is below the front guide parts 61 and the rear guide parts 62 and above the restricting part 67 in the up-down direction. Therefore, the elastic connection between the main housing 11 and the handle housing 15 and guiding of the sliding movement between the main housing 11 and the handle housing 15 are provided in a well-balanced manner in the up-down direction.

The detailed structure of the position detection mechanism 45 is now described.

Figure 10:
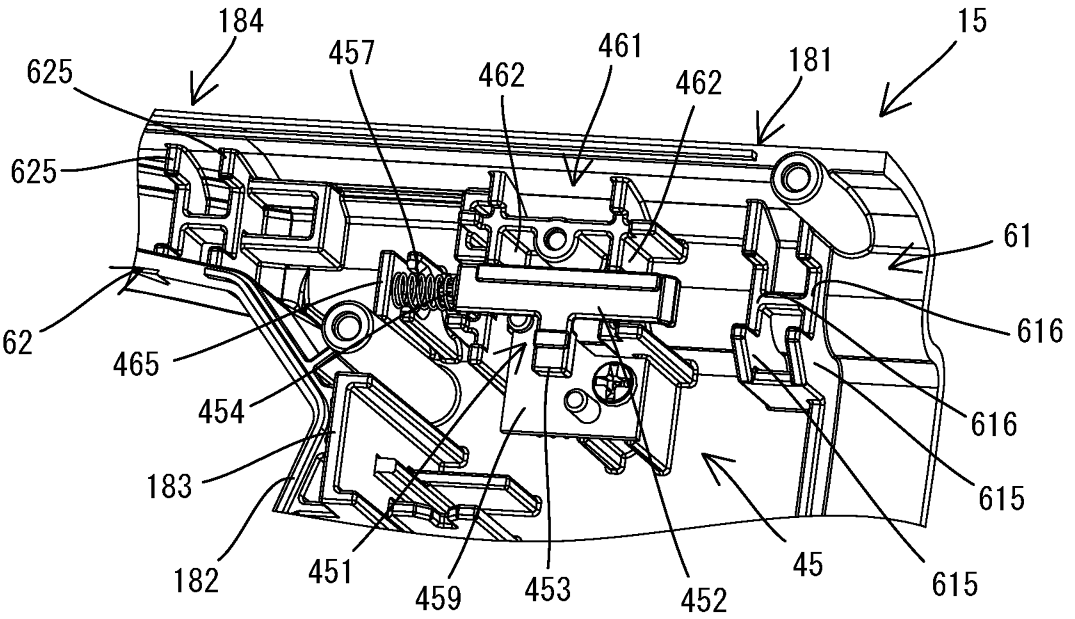
FIG. 10 is a partial perspective view of the handle housing wherein the right half of the handle housing is removed and a movable member is in (at) a frontmost position (initial position).
Figure 11:
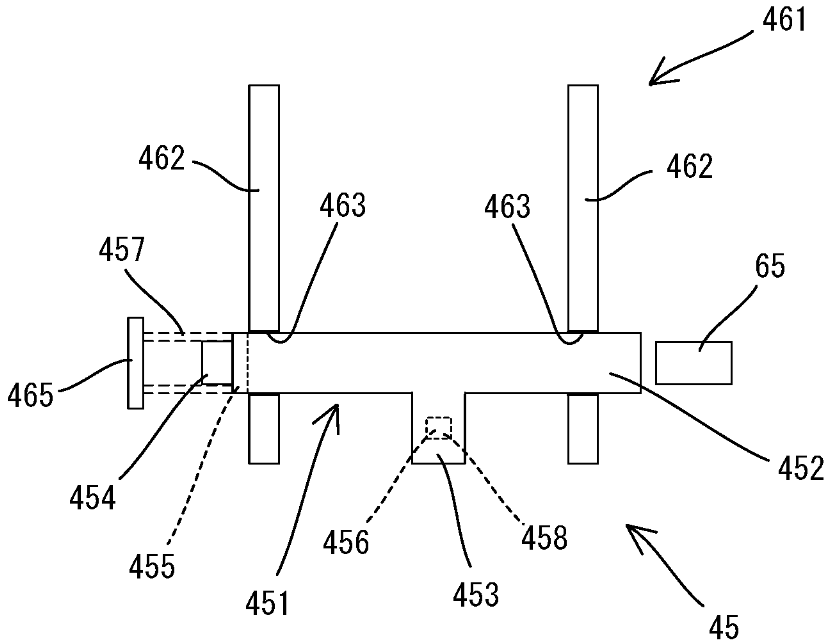
FIG. 11 is an explanatory view illustrating a position detection mechanism when the movable member is in (at) the initial position.
Figure 12:
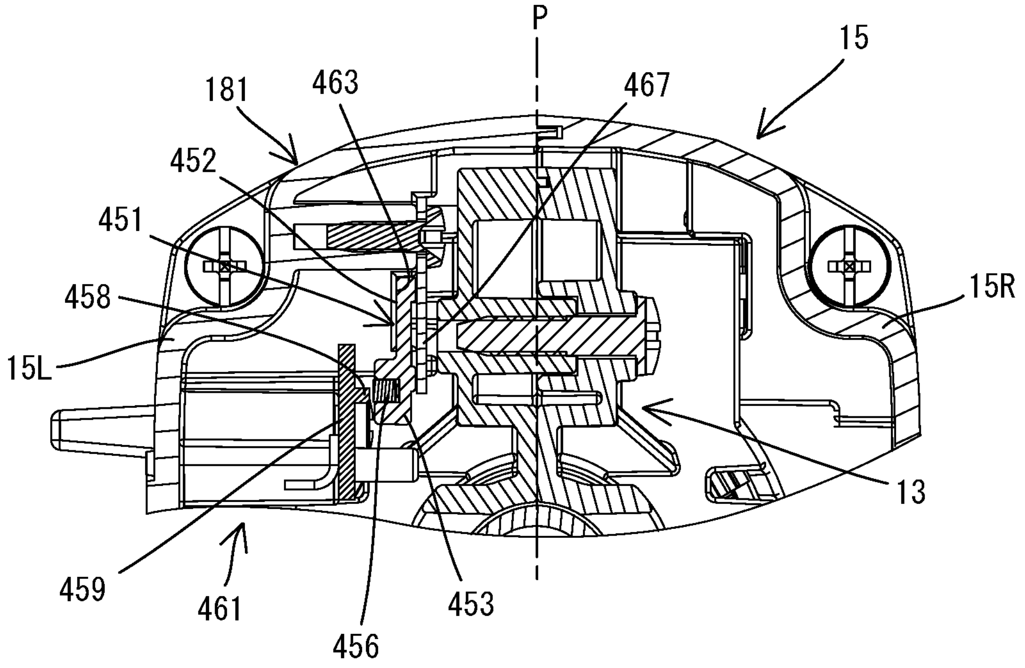
FIG. 12 is a cross-sectional view taken along line XII-XII in FIG. 4.

As shown in FIG. 10 through FIG. 12, in the present embodiment, the position detection mechanism 45 is mounted to the inside of the cover part 181 of the handle housing 15. The position detection mechanism 45 includes a movable member 451, a biasing member 457, and a hall sensor 458.

The movable member 451 as a whole is generally T-shaped. The movable member 451 includes an elongate base part 452 that extends linearly, and a projecting part 453 that projects from an approximate center of the base part 452. The movable member 451 is a single member formed of synthetic resin (polymer, plastic). A projection 454 for receiving a spring projects from one longitudinal end of the base part 452. A magnet 456 is fixed to the projecting part 453.

The movable member 451 is supported in the cover part 181 of the handle housing 15, so as to be movable in the front-rear direction relative to the handle housing 15. More specifically, the left wall of the cover part 181 has a support part 461. The support part 461 is disposed behind the guide wall 615 of the front guide part 61 and in front of the guide wall 625 of the rear guide part 62. The support part 461 includes wall portions that project inward (toward the plane P shown in FIG. 12) from the left wall of the cover part 181. The support part 461 includes two guide recesses 463 respectively formed in two support walls 462 that are spaced apart from each other in the front-rear direction. The two guide recesses 463 are aligned on a straight line that extends in the front-rear direction. Each of the guide recesses 463 has a shape that generally matches a sectional shape of the base part 452 of the movable member 451.

The movable member 451 is supported by the support walls 462 with the base part 452 partially disposed in the guide recesses 463 so as to be linearly slidable in the front-rear direction relative to the support walls 462. The movable member 451 is oriented such that the projection 454 of the base part 452 projects rearward and the projecting part 453 of the movable member 451 projects downward. The magnet 456 is exposed outside from the left-side surface of the projecting part 453. Although not shown in detail, a projection 455 projects leftward (see FIG. 11) from the rear end portion of the base part 452. When a rear surface of rear one of the support walls 462 contacts the projection 455 of the movable member 451, the rear support wall 462 prevents (blocks) further forward movement of the movable member 451. Thus, the rear one of the support walls 462 defines a frontmost position of the movable member 451 within its movable range.

The biasing member 457 is supported by the support part 461 behind the movable member 451. The biasing member 457 is a compression coil spring. One end portion of the biasing member 457 is fitted around and held by the projection 454 provided at the rear end portion of the base part 452. The other end portion of the biasing member 457 is held in contact with a stopper wall 465 of the support part 461. With such a configuration, the biasing member 457 always biases the movable member 451 frontward. Thus, in a state in which no rearward external force is applied (hereinafter referred to as an initial state), the movable member 451 is held at the frontmost position (hereinafter also referred to as an initial position).

The hall sensor 458 is a well-known sensor including a hall element. The hall sensor 458 is mounted on a circuit board 459. The circuit board 459 is disposed to the left of the movable member 451 and fixed to the support part 461 using a screw such that the hall sensor 458 faces the magnet 456. The hall sensor 458 is electrically connected to the controller 41 via electric wires that are not shown. When the magnet 456 is located within a predetermined detection area, the hall sensor 458 outputs a specific signal (ON signal) to the controller 41.

Further, as shown in FIG. 6 and FIG. 12, a thin cover plate 467 is disposed to the right of the movable member 451 and fixed to the support part 461 using a screw. The cover plate 467 covers a portion of a right-side surface of the movable member 451. The cover plate 467 is partially in contact with the movable member 451 and prevents the movable member 451 from moving out of the guide recesses 463, while allowing the movable member 451 to slide in the front-rear direction. The cover plate 467 is formed of aluminum. By employing the cover plate 467, the movable member 451 can be easily assembled and the movable member 451 can be held without affecting the magnet 456.

Operation of the position detection mechanism 45 is now described.

As shown in FIG. 3, a pressing projection 65 that is configured to move the movable member 451 by making contact with the movable member 451 is disposed in the main housing 11. More specifically, the pressing projection 65 projects rearward from a left upper end portion (specifically, from a rear end of the left stopper projection 631) of the stator housing part 133 of the motor housing 13.

When the handle housing 15 is at (in) its initial position (the rearmost position) relative to the main housing 11, as shown in FIG. 10 and FIG. 11, the movable member 451 is held in its initial position (the frontmost position). At this time, the front end of the base part 452 of the movable member 451 is rearward of and slightly apart from the pressing projection 65 of the main housing 11. The pressing projection 65, the movable member 451, and the biasing member 457 are aligned on a straight line that extends in the front-rear direction. The recesses 616 of the left front guide part 61 are also located on the straight line. When the movable member 451 is at (in) the initial position, the magnet 456 is located to the right of the hall sensor 458 and faces the hall sensor 458 (see FIG. 12). At this position, the magnet 456 is within the detection area of the hall sensor 458. Thus, the hall sensor 458 outputs the ON signal to the controller 41.

Figure 13:
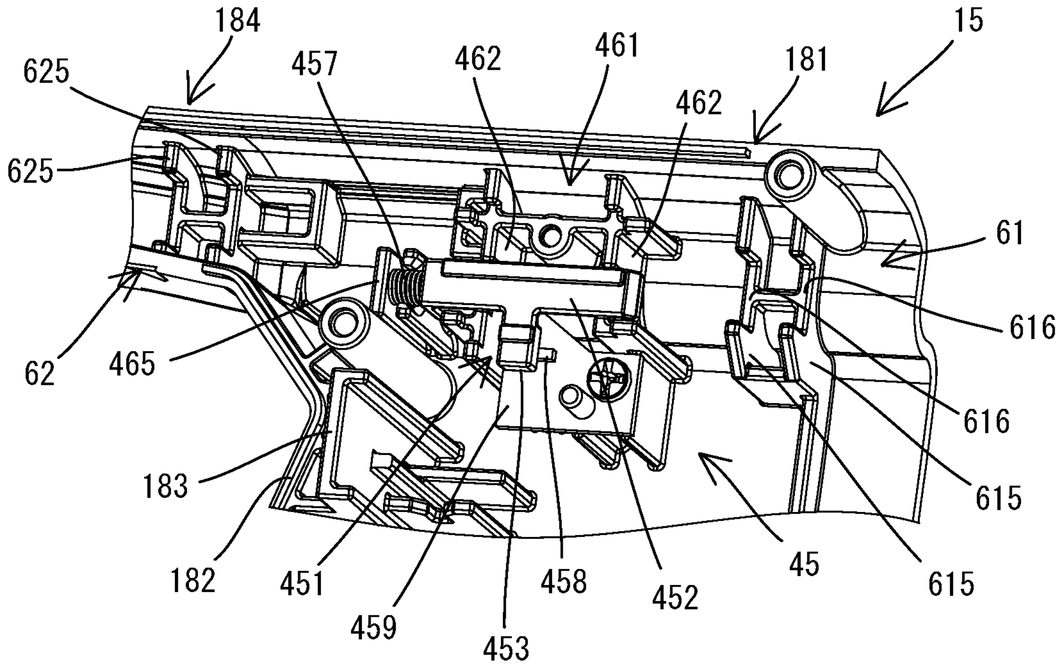
FIG. 13 is a partial perspective view of the handle housing wherein the right half of the handle housing is removed and the movable member is in (at) an OFF position.
Figure 14:
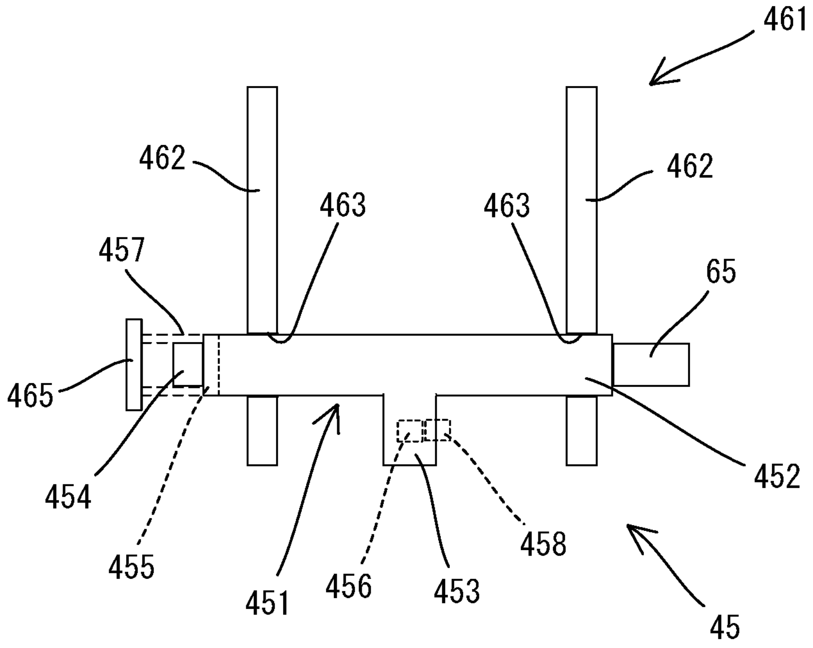
FIG. 14 is an explanatory view illustrating the position detection mechanism when the movable member is in (at) the OFF position.

On the other hand, when the handle housing 15 is moved forward from the initial position relative to the main housing 11, as shown in FIG. 13 and FIG. 14, the pressing projection 65 of the main housing 11 comes into contact with the front end of the base part 452 of the movable member 451 and moves the movable member 451 rearward against the biasing force of the biasing member 457. When the handle housing 15 reaches a predetermined position that is frontward of the initial position relative to the main housing 11, the movable member 451 reaches a predetermined position that is rearward of the initial position. At this time, the magnet 456 moves out of the detection area of the hall sensor 458, and thereby stops outputting the ON signal.

The predetermined position of the handle housing 15 at this time (hereinafter referred to as an OFF position) is slightly rearward of the frontmost position within the movable range of the handle housing 15. Similarly, the predetermined position of the movable member 451 (hereinafter referred to as an OFF position) is slightly frontward of the rearmost position within the movable range of the movable member 451. When the movable member 451 is located between the OFF position and the rearmost position, the hall sensor 458 does not output the ON signal.

As described above, the hall sensor 458 detects, via the magnet 456, the position of the movable member 451 that moves linearly in response to the movement of the handle housing 15 relative to the main housing 11. Thus, the hall sensor 458 can detect the position of the handle housing 15 relative to the main housing 11. A detection result of the hall sensor 458 is used by the controller 41 in controlling driving of the motor 2, as will be described in detail.

In the present embodiment, as described above, both of the movable member 451 and the hall sensor 458 of the position detection mechanism 45 are disposed in the handle housing 15. In a case in which one of the main housing 11 and the handle housing 15 has the movable member 451 while the other one of the main housing 11 and the handle housing 15 has the hall sensor 458, positional relationship between the movable member 451 and the hall sensor 458 might be different from designed (intended) relationship, due to dimensional errors of the main housing 11 and the handle housing 15. Consequently, erroneous detection of the hall sensor 458 might be caused. To address this possible problem, in the present embodiment, both of the movable member 451 and the hall sensor 458 are disposed in the same component, i.e., in the handle housing 15. Consequently, the positional relationship between the movable member 451 and the hall sensor 458 can be made more stable and thus the possibility of the erroneous detection can be reduced. In particular, in the present embodiment, not the main housing 11, but the handle housing 15 has the movable member 451 and the hall sensor 458. Therefore, the movable member 451 and the hall sensor 458 can be protected from vibration.

The movable member 451 and the hall sensor 458 are mounted on (held by) the cover part 181 within the cover part 181, which surrounds the rear portion of the motor housing 13 in the circumferential direction, of the handle housing 15. With such a configuration, reasonable arrangement of the movable member 451 and the hall sensor 458 is achieved while preventing a size increase of the main housing 11 and the handle housing 15 in the front-rear direction. Further, employing the movable member 451 that is linearly movable in the front-rear direction and located between the cover part 181 and the motor housing 13 (specifically, the upper extending part 141) can also suppress a size increase of the main housing 11 and the handle housing 15 in the radial direction.

The movable member 451 and the hall sensor 458 are located between the front guide parts 61 and the rear guide parts 62 in the front-rear direction. Further, the movable member 451 and the hall sensor 458 are located at generally the same positions as the front guide parts 61 and the rear guide parts 62 in the up-down direction. Thus, the movable member 451 and the hall sensor 458 are disposed at positions where the main housing 11 and the handle housing 15 stably move relative to each other in the front-rear direction. Consequently, the detection accuracy can be improved.

Further, as described above, the pressing projection 65, the movable member 451, and the biasing member 457 are aligned on the straight line that extends in the front-rear direction, so that the pressing projection 65 can linearly move the movable member 451 with high accuracy. Further, the magnet 456, which is a target to be detected by the hall sensor 458, is fixed to the movable member 451 at a position that is offset from (not on) this straight line. Thus, the position of the hall sensor 458 can be more freely selected.

In the present embodiment, as described above, the hall sensor 458 is configured to detect the magnet 456 located within the detection area. Alternatively, the hall sensor 458 may be capable of distinctively detecting the S-pole and the N-pole of the magnet 456. In such a case, for example, the magnet 456 is mounted to the movable member 451 such that the N-pole is at the front and the S-pole is at the rear. The hall sensor 458 detects the S-pole when the movable member 451 is located between the initial position and the predetermined position (not including the predetermined position) and the hall sensor 458 detects the N-pole when the movable member 451 is located between the predetermined position and the rearmost position. Further, the hall sensor 458 outputs different signals to the controller 41 depending on whether the S-pole or the N-pole of the magnet 456 is detected. Also in this case, the hall sensor 458 can detect the position of the movable member 451 and also the position of the handle housing 15 relative to the main housing 11, using the magnet 456.

The driving control of the motor 2 performed by the controller 41 is now described.

In the present embodiment, the controller 41 (more specifically, the control circuit) is configured to perform a so-called “soft no-load” control. The soft no-load control refers to a driving control method in which, while the switch 173 is ON, motor 2 is driven at a rotational speed that does not exceed a predetermined relatively low rotation speed (hereinafter referred to as an initial rotation speed) in a no-load state, and the motor 2 is allowed to be driven at a rotational speed that exceeds the initial rotation speed in a loaded state. The no-load state refers to a state in which no load is applied to the tool accessory 91. The loaded state refers to a state in which a load is applied to the tool accessory 91. According to the soft no-load control, a wasteful consumption of the electric power by the motor 2 can be reduced in the no-load state.

In the present embodiment, the detection result of the position detection mechanism 45 (specifically, of the hall sensor 458) is used in the soft no-load control for distinguishing between the no-load state and the loaded state. When the tool accessory 91 is pressed against a workpiece, the handle housing 15, which is elastically connected to the main housing 11, moves forward relative to the main housing 11. Thus, the relative forward movement of the handle housing 15 and thus the linear rearward movement of the movable member 451 correspond to transition from the no-load state to the loaded state. Accordingly, the hall sensor 458 can appropriately detect the pressing of the tool accessory 91 against the workpiece (namely, the transition from the no-load state to the loaded state) through the movement of the movable member 451 (specifically presence/absence of the detection of the magnet 456). In particular, in the present embodiment, with the configuration of the movable member 451 and the hall sensor 458 as described above, the hall sensor 458 can accurately detect the transition from the no-load state to the loaded state.

More specifically, in the no-load state, the handle housing 15 and the movable member 451 are located at their respective initial positions (at the rearmost position and the frontmost position), due to the biasing force of the elastic member 51. Thus, the hall sensor 458 detects the magnet 456 and the position detection mechanism 45 outputs the ON signal. While the ON signal is outputted from the position detection mechanism 45, the controller 41 determines that the rotary hammer 1 is in the no-load state. In response to a change of a state of the switch 173 from the OFF state to the ON state, the controller 41 starts driving the motor 2.

In the present embodiment, the rotation speed that has been set via a speed changing knob (not shown) is used as a rotation speed that corresponds to a maximum manipulation amount (depressed amount) of the trigger 171 (i.e., as a maximum rotation speed). The rotation speed of the motor 2 is set based on the maximum rotation speed and an actual manipulation amount (depressed amount) of the trigger 171.

In the no-load state, in a case in which a rotation speed that is calculated based on the maximum rotation speed and the manipulation amount of the trigger 171 is equal to or less than the initial rotation speed, the controller 41 uses the calculated rotation speed as it is to drive the motor 2. On the other hand, in a case in which the calculated rotation speed exceeds the initial rotation speed, the controller 41 drives the motor 2 at the initial rotation speed.

When the motor 2 is driven, the driving mechanism 3 is driven according to the action mode that has been selected via the mode changing lever 39, and thereby at least one of the hammer action and the drilling action is performed.

When the user grips the grip part 17 and presses the tool accessory 91 against the workpiece, the handle housing 15 moves forward from its initial position relative to the main housing 11, while compressing the elastic member 51. At this time, the front guide parts 61 and the rear guide parts 62 guide the relative sliding between the main housing 11 and the handle housing 15 in the front-rear direction. In response to the relative forward movement of the handle housing 15, the movable member 451 is pressed by the pressing projection 65 and moved rearward from its initial position. When the handle housing 15 and the movable member 451 reach their respective OFF positions, the hall sensor 458 stops outputting the ON signal. The controller 41 recognizes the change from the OFF state to the ON state of the hall sensor 458 as the transition from the no-load state to the loaded state.

In response to detecting the transition to the loaded state, the controller 41 drives the motor 2 at the rotation speed that is calculated based on the maximum rotation speed and the manipulation amount of the trigger 171. Unlike in the no-load state, even if the calculated rotation speed exceeds the initial rotation speed, the controller 41 does not limit the rotation speed.

In a case in which the switch 173 is turned ON while the hall sensor 458 is OFF (i.e., in the loaded state), the controller 41 starts to drive the motor 2 at the rotation speed that is calculated based on the maximum rotation speed and the manipulation amount of the trigger 171.

In either case, when the depression of the trigger 171 is cancelled and the switch 173 is turned OFF, the controller 41 stops driving the motor 2.

In a case in which the controller 41 detects the change from the OFF state to the ON state of the hall sensor 458 (i.e., the relative movement of the handle housing 15 and the movable member 451 from their OFF positions toward their initial positions, or the transition from the loaded state to the no-load state) while the switch 173 is ON, the controller 41 may limit the rotation speed of the motor 2 to the initial rotation speed or less. In this case, for example, the controller 41 may monitor a duration of the ON state of the hall sensor 458 after the change is detected, using the timer. And then, only in a case in which the hall sensor 458 continues to be ON for a predetermined time period, the controller 41 may limit the rotation speed of the motor 2 to the initial rotation speed or less. According to this control method, the controller 41 can reliably distinguish between a temporary change to the ON state due to vibration of the main housing 11 during a processing operation and the actual change from the loaded state to the no-load state.

Further, in the present embodiment, the controller 41 performs a control based on the detection result of the acceleration detection unit 43 (specifically, the acceleration sensor), in addition to the soft no-load control. More specifically, in a case in which the controller 41 detects the error signal outputted from the acceleration detection unit 43, the controller 41 stops driving the motor 2. As described above, the error signal indicates the excessive rotation state of the main housing 11 around the driving axis A1. Thus, in a case in which the controller 41 detects the error signal, the controller 41 stops driving the motor 2 in order to avoid further rotation of the main housing 11. Alternatively, the controller 41 may determine whether or not the excessive rotation is caused, based on the error signal and other additional information (for example, torque applied to the tool accessory 91 and/or a driving current of the motor 2).

Correspondences between the features of the embodiment described above and the features of the present disclosure or invention are described below. The features of the above-described embodiments are merely exemplary and do not limit the features of the present disclosure or the present invention.

The rotary hammer 1 is one example of "a power tool having a hammer mechanism". The motor 2, the stator 21, the rotor 23, the motor shaft 25, and the rotational axis A2 are examples of "a motor", "a stator", "a rotor", "a motor shaft", and "a first axis", respectively. The driving mechanism 3 and the driving axis A1 are examples of "a driving mechanism" and "a second axis", respectively. The tool accessory 91 is one example of "a tool accessory". The main housing 11 is one example of "a main housing". The handle housing 15 and the grip part 17 are examples of "a handle housing" and "a grip part", respectively. The elastic member 51 is one example of "a first elastic member". The front guide part 61 and the rear guide part 62 are examples of "a first guide part" and "a second guide part, respectively. Each of the guide projection 611 and the guide projection 621 is one example of "a first engagement part". Each of the recess 616 and the recess 626 is one example of "a second engagement part".

The stator housing part 133 is one example of "a stator housing part". The upper extending part 141 is one example of "a first extending part". The cover part 181 and the upper extending part 184 are examples of "a cover part" and "a second extending part", respectively. Each of the guide projection 611 and the guide projection 621 is one example of "a projection". Each of the recess 616 and the recess 626 is one example of "a recess". The restricting part 67 is one example of "a restricting part". The contact part 671 and the contact plate 673 are examples of "a first contact part" and "a second contact part", respectively. The contact surface 672 and the a surface of the contact plate 673 are examples of "a first contact surface" and "a second contact surface", respectively. The contact plate 673 and the elastic member 677 are examples of "a plate member" and "a second elastic member", respectively. The lower extending part 146 is one example of "a third extending part". The cover plate 612 is one example of "a metal part".

The above-described embodiment is merely an exemplary embodiment, and therefore the power tool according to the present disclosure is not limited to the rotary hammer 1. For example, the following modifications may be made. Further, one or more of these modifications may be employed in combination with any one of the rotary hammer 1 described in the embodiment and the claimed features.

In the above-described embodiment, although the rotary hammer 1 is described as an example of the power tool having the hammer mechanism, the present disclosure may be applied to a power tool having a hammer mechanism other than the rotary hammer 1 (for example, an electric hammer (demolition hammer or scraper)). Further, the rotary hammer 1 may have only two action modes of the hammer mode and the drill mode. The motor 2 and the driving mechanism 3 may be modified as needed, depending on the power tool to which the present disclosure is applied.

The structures of the main housing 11 and the handle housing 15 may be modified as needed. For example, each of the gear housing 12 and the motor housing 13 of the main housing 11 may have a shape that is different from that in the embodiment, and the connection therebetween may be different from that in the embodiment. Such modifications may be similarly applied to the handle housing 15. Further, the elastic connecting structure between the main housing 11 and the handle housing 15 may be modified as needed. For example, the position of the elastic member 51 may be changed. Further, multiple elastic members may be interposed between the main housing 11 and the handle housing 15. Aside from the compression coil spring, any one of various kinds of springs, rubbers and synthetic resins (polymer, plastic) may be employed as the elastic member.

The structures (the shape, the size and the like) and the positions of the front guide part 61 and the rear guide part 62, and the number of the front guide parts 61 and/or the rear guide parts 62 may be modified as needed. Possible modifications that are applicable to the front guide part 61 and the rear guide part 62 are now exemplarily described.

For example, in the above-described embodiment, the front guide part 61 and the rear guide part 62 have substantially the same structure. Specifically, the guide projections 611 and 621 have substantially the same structure, and the recesses 615 and 625 have substantially the same structure. However, the front guide part 61 and the rear guide part 62 may have different structures from each other, as long as each of the front guide part 61 and the second guide part 62 is formed by a set of (at least two) engagement parts that are slidably engaged with each other. For example, the front guide part 61 may include a projection disposed on the main housing 11 and a recess (groove) formed in the handle housing 15, and the rear guide part 62 may include a recess (groove) formed in the main housing 11 and a projection disposed on the handle housing 15. The reversed combination may also be employed. Further, each of the guide projections 611 and 621 and the recesses 616 and 626 may have a shape that is different from that described in the above embodiment. For example, each of the guide projections 611 and 621 and the recesses 616 and 626 may have a semicircular sectional shape or a triangular sectional shape.

Further, only one front guide part 61 and only one rear guide part 62 may be employed. In this modified embodiment, for example, a single guide projection 611 may project upward from the upper extending part 141 and two receiving recesses 616 may be formed in the upper wall of the cover part 181 in the front guide part 61. This modification may be similarly applied to the rear guide part 62. Alternatively, only one front guide part 61 may be disposed generally at the center in the left-right direction, and the two rear guide parts 62 may be disposed like in the above embodiment. Similarly, the two front guide part 61 and only one rear guide part 62 may be employed.

Further, in the above embodiment, the front guide part 61 and the rear guide part 62 are generally located at the same level in the up-down direction. However, the front guide part 61 and the rear guide part 62 may be further spaced from each other in the up-down direction. A distance in the front-rear direction between the front guide part 61 and the rear guide part 62 may also be changed. However, in order to precisely guide the sliding between the main housing 11 and the handle housing 15, it may be preferable that the distance between the front guide part 61 and the rear guide part 62 is as large as possible. Thus, it may be preferable that the front guide part 61 is disposed in the front end portion of the handle housing 15 and the rear guide part 62 is disposed in the rear end portion of the handle housing 15.

The structure and the position of the restricting part 67 and the number of the restricting parts 67 may be modified as needed, or the restricting part 67 may be omitted. For example, the restricting part 67 may be formed by the contact part 671 that is disposed on the main housing 11 and two resin (plastic) projections that are formed integrally with the left and right side walls of the handle housing 15. The two projections may be configured to contact the contact surfaces 672 of the contact part 671. Alternatively, the contact plates 673 may be omitted and the elastic members 677 may be in direct contact with the contact surfaces 672, respectively. Further, the elastic member 677 may be formed of different type of elastic member (for example, a spring or a rubber).

In the above embodiment, the position of the handle housing 15 relative to the main housing 11 detected by the position detection mechanism 45 is used in the soft no-load control. However, a different type of detection mechanism may be employed as long as it is capable of detecting the position of the handle housing 15 relative to the main housing 11. For example, a non-contact-type sensor (for example, an optical sensor) other than the magnetic-field-detection type sensor or a contact-type detection mechanism (for example, a mechanical switch) may be employed. Further, the position of the position detection mechanism 45 may be changed. Further, the position detection mechanism 45 may be omitted, and the soft no-load control may not be performed.

The acceleration detection unit 43 may be disposed at another position (for example, in the lower extending part 186) in the base part 18. Further, in order to detect the rotation state of the rotary hammer 1 around the driving axis A1, a detector that detects a different type of physical quantity (for example, a displacement, a velocity, an angular velocity, or the like) may be employed. In a power tool having a hammer mechanism that only performs the hammer action, the excessive rotation due to jamming or binding does not occur, and therefore such a detector is not needed. The elastic support structure of the acceleration sensor unit 43 may be modified or omitted.

The rotary hammer 1 may be driven by electric power supplied from an external AC power source, instead of from the battery 93. That is, the battery attached part 187 may be omitted.

The position of the controller 41 may be changed. Further, in the above embodiment, the control circuit of the controller 41 is structured as the microcomputer including the CPU and the like. However, another type of the control circuit, e.g., a programmable logic device such as ASIC (Application Specific Integrated Circuits) and FPGA (Field Programmable Gate Array) may be employed. Further, control processing in the above embodiment may be performed through distributed processing using a plurality of control circuits.

Further, in view of the nature of the present disclosure and the above-described embodiment, the following Aspects 1 and 2 can be provided. At least one of Aspects 1 and 2 can be employed in combination with any one of the rotary hammer 1 of the above-described embodiment, its modifications and the claimed features.

(Aspect 1)

The at least one projection has a parallelepiped shape, and the at least one recess is formed in a rectangular shape that generally conforms to the at least one projection.

(Aspect 2)

The grip part has a first end portion and a second end portion, the first end portion is located on the second axis, and the second end portion is an end portion opposite to the first end portion, and spaced apart from the second axis.

Further, following Aspects A to J are provided with the aim to provide a power tool having a hammer mechanism that is capable of appropriately detecting pressing of a tool accessory against a workpiece and controlling driving of a motor. Each one of the following Aspects A to J may be employed individually or in combination with any one or more of the other aspects. Alternatively, at least one of the following Aspects A to J may be employed in combination with at least one of the rotary hammer 1 of the above-described embodiment, the above-described modifications and aspects, and the claimed features.

(Aspect A)

A power tool having a hammer mechanism, the power tool comprising:

a motor including a stator, a rotor, and a motor shaft, the motor shaft extending from the rotor and being rotatable integrally with the rotor around a first axis;

a driving mechanism configured to perform a hammer action of linearly driving a tool accessory along a second axis using power generated by the motor, the second axis extending parallel to the first axis and defining a front-rear direction of the power tool;

a main housing that houses the motor and the driving mechanism and that extends in the front-rear direction;

a handle housing including a grip part to be gripped by a user, the handle housing being elastically connected to the main housing to be movable relative to the main housing at least in the front-rear direction;

a movable member disposed in/on a first one of the main housing and the handle housing and configured to move in response to relative movement of a second one of the main housing and the handle housing in the front-rear direction;

a detector disposed in/on the first one of the main housing and the handle housing, in/on which the movable member is disposed, and configured to detect pressing of the tool accessory against a workpiece by detecting movement of the movable member; and a control device configured to control driving of the motor based on a detection result of the detector.

When the tool accessory is pressed against the workpiece, the handle housing, which is elastically connected to the main housing, moves forward relative to the main housing. Thus, the transition from a no-load state to a loaded state corresponds to the relative forward movement of the handle housing. In the power tool according to the present aspect, relative movement of the other one of the main housing and the handle housing in the front-rear direction corresponds to movement of the movable member. Therefore, the detector can appropriately detect the pressing of the tool accessory against the workpiece (the transition from the no-load state to the loaded state) through the movement of the movable member. The control device can thus control driving of the motor based on the detection result of the detector, depending on whether the tool accessory is in the no-load state or in the loaded state.

Further, in the power tool of Aspect A, both of the movable member and the detector are disposed in/on the first one (same one) of the main housing and the handle housing. If the movable member is disposed in/on the first one of the main housing and the handle housing and the detector is disposed in/on the second one of the main housing and the handle housing, a positional relationship between the movable member and the detector may be different from the designed original relationship due to dimensional errors in the main housing and the handle housing, and therefore the detector may not be able to accurately detect the transition from the no-load state to the loaded state. On the other hand, by arranging both of the movable member and the detector in/on the same component (the main housing or the handle housing), the positional relationship between the movable member and the detector can be made stable and a possibility of an erroneous detection can be reduced.

(Aspect B)

The power tool according to Aspect A, wherein:

the handle housing includes a cover part that surrounds a portion of the main housing at least partially in a circumferential direction around the second axis, and both of the movable member and the detector are disposed on (i) the inside of the cover part; or (ii) on an outer periphery of the portion of the main housing.

In Aspect B, both of the movable member and the detector may be disposed on the inside of the cover part. Alternatively, both of the movable member and the detector may be disposed on the outer periphery of the portion of the main housing surrounded by the cover part. According to Aspect B, the movable member and the detector can be reasonably arranged without size increase of the power tool in the front-rear direction.

(Aspect C)

The power tool according to Aspect A or B, further comprising:

a first guide part and a second guide part configured to guide relative sliding between the main housing and the handle housing in the front-rear direction, wherein:

the first guide part and the second guide part are spaced apart from each other in the front-rear direction, and the movable member and the detector are located between the first guide part and the second guide part in the front-rear direction.

According to Aspect C, the movable member and the detector can be arranged at positions where the main housing and the handle housing stably move relative to each other in the front-rear direction, so that the detection accuracy can be improved.

(Aspect D)

The power tool according to any one of Aspect A to C, wherein:

the movable member is configured to be linearly movable, and the detector is configured to detect linear movement of the movable member.

According to Aspect D, the detection mechanism can be made simple and relatively small.

(Aspect E)

The power tool according to Aspect D, wherein:

the second one of the main housing and the handle housing has a contact part configured to move the movable member frontward or rearward by making contact with the movable member during the relative movement, the power tool further includes a biasing member configured to bias the movable member toward the contact part, and the contact part, the movable member, and the biasing member are aligned on a straight line extending in the front-rear direction.

According to Aspect E, the movable member can be linearly moved with high accuracy.

(Aspect F)

The power tool according to Aspect E, wherein a target to be detected by the detector is disposed on the movable member, at a position offset from the straight line.

According to Aspect F, a support structure of the movable member and the position of the detector can be more freely selected.

(Aspect G)

The power tool according to any one of Aspects D to F, wherein:

a target to be detected by the detector is a magnet mounted on the movable member, and the movable member is formed of synthetic resin.

According to Aspect G, a possibility of the erroneous detection of the detector can be reduced.

(Aspect H)

The power tool according to Aspect G, wherein:

the first one of the main housing and the handle housing has a recess in which the movable member is disposed to be slidable in the front-rear direction, and the power tool further includes a restricting member formed of aluminum and disposed to restrict movement of the movable member outward of the recess.

According to Aspect H, assembling of the movable member can be facilitated and the movable member can be held without affecting the magnet.

(Aspect I)

The power tool according to any one of Aspects A to H, wherein both of the movable member and the detector are mounted to the handle housing.

According to Aspect I, the detector, which is a precision instrument, can be effectively protected from vibration.

(Aspect J)

The power tool having the hammer mechanism according to any one of Aspects A to I, wherein:

the grip part is located behind the main housing and extends in a direction crossing the second axis, the grip part includes a first end portion and a second end portion, the first end portion is disposed on the second axis, the second end portion is an end portion opposite to the first end portion and is spaced apart from the second axis, and the handle housing includes a connection part that connects the second end portion of the grip part and the main housing such that the connection part and the grip part together form an annular part.

Correspondences between the features of the embodiment described above and the features of Aspects A to J are described below. The features of the above-described embodiments are merely exemplary and do not limit the features of Aspects A to J.

The rotary hammer 1 is one example of "a power tool having a hammer mechanism". The motor 2, the stator 21, the rotor 23, the motor shaft 25, and the rotational axis A2 are examples of "a motor", "a stator", "a rotor", "a motor shaft", and "a first axis", respectively. The driving mechanism 3 and the driving axis A1 are examples of "a driving mechanism" and "a second axis", respectively. The tool accessory 91 is one example of "a tool accessory". The main housing 11 is one example of "a main housing". The handle housing 15 and the grip part 17 are examples of "a handle housing" and "a grip part", respectively. The movable member 451 is one example of "a movable member". The hall sensor 458 is one example of "a detector". The controller 41 (the control circuit) is one example of "a control device".

The cover part 181 is one example of "a cover part". The front guide part 61 and the rear guide part 62 are examples of "a first guide part" and "a second guide part", respectively. The biasing member 457 is one example of "a biasing member". The pressing projection 65 is one example of "a contact part". The magnet 456 is one example of "a magnet". The guide recess 463 is one example of "a recess". The cover plate 467 is one example of "a restricting member". The grip part 17 is one example of "a grip part". The upper end portion and the lower end portion of the grip part 17 are examples of "a first end portion" and "a second end portion", respectively. The base part 18 is one example of "a connection part".

The power tool according to any one of Aspects A to J is not limited to the rotary hammer 1 in the above-described embodiment. For example, the following modifications may be made. At least one of these modifications may be employed in combination with at least one of the rotary hammer 1 of the above-described embodiment, the above-described modifications and aspects, and the claimed features.

In the above embodiment, although the rotary hammer 1 is described as an example of the power tool, the power tool according to Aspects A to J may be a power tool with a hammer mechanism other than the rotary hammer 1 (for example, an electric hammer (demolition hammer or scraper). Further, the rotary hammer 1 may have only two action modes of the hammer mode and the drill mode. The motor 2 and the driving mechanism 3 may be modified as needed, depending on the power tool.

The structures of the main housing 11 and the handle housing 15 may be modified as needed. For example, each of the main housing 11, the gear housing 12, and the motor housing 13 may have a shape different from that in the embodiment, and the connection therebetween may be different from that in the embodiment. Further, for example, instead of the handle housing 15, a handle housing may be employed that includes: a tubular cover part that surrounds the rear end portion of the main housing 11 in the circumferential direction; and a grip part that projects from the cover part in a direction crossing the driving axis A1 like a cantilever.

The elastic connecting structure between the main housing 11 and the handle housing 15 may be modified as needed. For example, the position of the elastic member 51 may be changed. Further, multiple elastic members may be interposed between the main housing 11 and the handle housing 15. Aside from the compression coil spring, any one of various kinds of springs, rubbers and synthetic resins (polymer, plastic) may be employed as the elastic member.

The structures and the positions of the front guide part 61, the rear guide part 62, and the restricting part 67, and the number of the front guide parts 61, the rear guide parts 62, or the restricting parts 67 may be modified as needed. Further, at least one of the front guide parts 61, the rear guide parts 62, and the restricting part 67 may be omitted.

Further, the structure and the position of the position detection mechanism 45 that detects pressing of the tool accessory 91 against a workpiece are not limited to the examples described in the above embodiment.

For example, the movable member 451 may be formed in a shape other than the T-shape, e.g., in an arc shape or in a tubular shape. Similarly, the shape of the pressing projection 65 that contacts (presses) the movable member 451 may also be changed. Further, the movable member 451 may be supported to be movable along an arc. According to such a modification, or regardless of such a modification, the support structure of the movable member 451 may be appropriately modified. The cover plate 467 may be omitted, depending on the support structure. The magnet 456 may be located on the straight line together with the pressing projection 65, the movable member 451, and the biasing member 457. In this modified embodiment, the position of the hall sensor 458 may also be changed. Aside from the compression coil spring, any one of various kinds of springs, rubbers and synthetic resins (polymer, plastic) may be employed as the biasing member 457, and the position of the biasing member 457 may also be changed.

For example, the movable member 451 and the hall sensor 458 may be mounted on any one of a right wall, a top wall, and a bottom wall of the cover part 181, instead of being mounted on the left wall. Alternatively, both of the movable member 451 and the hall sensor 458 may be mounted to the main housing 11 (for example, the upper extending part 141). In this modified embodiment, for example, a projection formed on the handle housing 15 may move the movable member 451 in response to the relative movement of the handle housing 15.

A method of detecting the movement of the movable member 451 is not especially limited. Instead of the magnetic-field-detection type hall sensor 458, an optical sensor or a contact-type mechanical switch may be employed. As long as the detector and the movable member 451 are disposed in/on the same one of the main housing 11 and the handle housing 15, the position of the detector may be appropriately selected, depending on the structure of the movable member 451 and/or the method of detecting the movable member 451.

The acceleration detection unit 43 may be disposed at another position (for example, in the lower extending part 186) in the base part 18. Further, in order to detect the rotation state of the rotary hammer 1 around the driving axis A1, a detector that detects a different type of physical quantity (for example, a displacement, a velocity, an angular velocity, or the like) may be employed. In a power tool having a hammer mechanism that only performs the hammer action, the excessive rotation due to jamming or binding does not occur, and therefore such a detector is not needed. The elastic support structure of the acceleration sensor unit 43 may be modified or omitted.

The rotary hammer 1 may be driven by electric power supplied from an external AC power source, instead of from the battery 93. That is, the battery attached part 187 may be omitted.

The position of the controller 41 may be modified as needed. Further, in the above embodiment, the control circuit of the controller 41 is structured as the microcomputer including the CPU and the like. However, another type of the control circuit, e.g., a programmable logic device such as ASIC (Application Specific Integrated Circuits) and FPGA (Field Programmable Gate Array) may be employed. Further, control processing in the above embodiment may be performed through distributed processing using a plurality of control circuits.

DESCRIPTION OF THE REFERENCE NUMERALS

1: rotary hammer, 2: motor, 3: driving mechanism, 11: main housing, 12: gear housing, 121: barrel part, 125: support member, 13: motor housing, 13L, 13R: half, 131: connection part, 133: stator housing part, 135: bearing housing part, 136: through hole, 141: upper extending part, 146: lower extending part, 147: opening, 15: handle housing, 15L, 15R: half, 17: grip part, 171: trigger, 173: switch, 18: base part, 181: cover part, 182: rear wall, 183: support wall, 184: upper extending part, 186: lower extending part, 187: battery-mounting part, 188: front extending part, 21: stator, 23: rotor, 25: motor shaft, 251: bearing, 253: bearing, 28: fan, 30: tool holder, 31: motion-converting mechanism, 32: intermediate shaft, 33: rotation member, 34: oscillating member, 35: piston cylinder, 36: cylinder, 37: striking mechanism, 371: striker, 373: impact bolt, 38: rotation-transmitting mechanism, 381: first gear, 382: second gear, 39: mode changing lever, 41: controller, 43: acceleration detection unit, 431: sensor body, 433: case, 435: elastic member, 437: pin, 45: position detection mechanism, 451: movable member, 452: base part, 453: projecting part, 454: projection, 455: projection, 456: magnet, 457: biasing member, 458: hall sensor, 459: circuit board, 461: support part, 462: support wall, 463: guide recess, 465: stopper wall, 467: cover plate, 51: elastic member, 53: spring receiving member, 59: bellow part, 61: front guide part, 611: guide projection, 612: cover plate, 615: guide wall, 616: recess, 62: rear guide part, 621: guide projection, 622: cover plate, 625: guide wall, 626: recess, 631: stopper projection, 633: stopper wall, 635: stopper wall, 65: pressing projection, 67: restricting part, 671: contact part, 672: contact surface, 673: contact plate, 674: projection, 677: elastic member, 91: tool accessory, 93: battery, A1: driving axis, A2: rotational axis.

What is claimed is:

1. A power tool having a hammer mechanism, the power tool comprising:

a motor including a stator, a rotor, and a motor shaft, the motor shaft extending from the rotor and being rotatable integrally with the rotor around a first axis;

a driving mechanism configured to perform a hammer action of linearly driving a tool accessory along a second axis using power from the motor, the second axis (i) is parallel to the first axis and (ii) is in a front-rear direction of the power tool;

a main housing that houses the motor and the driving mechanism;

a handle housing (i) connected to the main housing via a first elastic member to be movable relative to the main housing at least in the front-rear direction and (ii) including an elongate grip part behind the main housing and extending in a direction crossing the second axis; and a first guide part and a second guide part configured to guide relative sliding between the main housing and the handle housing in the front-rear direction, wherein:

each of the first guide part and the second guide part includes a first engagement part and a second engagement part that are configured to engage each other to be slidable in the front-rear direction relative to each other;

the main housing has the first engagement part;

the handle housing has the second engagement part;

the second guide part is spaced apart from the first guide part and located rearward of the first guide part in the front-rear direction;

an up-down direction of the power tool is (i) orthogonal to the second axis and (ii) corresponds to an extension direction of the grip part;

the main housing includes:

a stator housing part that houses the stator; and a first extending part (i) above the first axis and (ii) that extends rearward of the stator housing part;

the handle housing includes:

a cover part surrounding the stator housing part at least partially in a circumferential direction around the first axis; and a second extending part (i) extending frontward from an upper end portion of the grip part, (ii) connected to the cover part and (iii) covering at least a portion of the first extending part;

a portion of the first extending part that overlaps the second extending part circumferentially has the first engagement part of the second guide part;

the second engagement part of the second guide part is inside the second extending part;

a rearwardmost end of the first extending part is rearward of a rearwardmost end of the motor shaft; and the first engagement part of the second guide part is rearward of the rearwardmost end of the motor shaft.

2. The power tool according to claim 1, wherein the first guide part is radially outward of the stator.

3. The power tool according to claim 1, wherein at least one of the first guide part and the second guide part is a pair of parts that is symmetric relative to a plane that contains the first axis and the second axis.

4. The power tool according to claim 1, wherein:

one of the first engagement part and the second engagement part of both the first guide part and the second guide part includes at least one projection; and the other one of the first engagement part and the second engagement part of the both the first guide part and the second guide part includes at least one recess configured to engage the at least one projection.

5. The power tool according to claim 1, wherein:

an up-down direction of the power tool is (i) orthogonal to the second axis and (ii) corresponds to an extension direction of the grip part;

a left-right direction of the power tool is orthogonal to both of the front-rear direction and the up-down direction;

the power tool further includes a restricting part configured to restrict relative movement between the main housing and the handle housing in the left-right direction;

the restricting part includes a first contact part and a second contact part that are configured to make contact with each other;

the main housing has the first contact part;

the handle housing has the second contact part;

the first guide part and the second guide part are above the first axis in the up-down direction; and the restricting part is below the first axis in the up-down direction.

6. The power tool according to claim 5, wherein the restricting part is between the first guide part and the second guide part in the front-rear direction.

7. The power tool according to claim 5, wherein the main housing includes a third extending part (i) below the first axis, (ii) that extends rearward of the stator housing part, (iii) that is in the handle housing, (iv) has the first contact part and (v) is configured to guide an electric wire extending from the motor.

8. The power tool according to claim 5, wherein:

the first contact part and the second contact part of the restricting part are in slidable contact with each other; and the first elastic member is below the first guide part and the second guide part and above the restricting part in the up-down direction.

9. The power tool according to claim 5, wherein the main housing includes a third extending part extending rearward from the stator housing part into the handle housing;

a rearwardmost end of the third extending part is rearward of the rearwardmost end of the motor shaft; and the first contact part is rearward of the rearwardmost end of the motor shaft.

10. The power tool according to claim 1, wherein at least one of the first engagement part and the second engagement part of both the first guide part and the second guide part includes a metal part that is slidable along the other one of the first engagement part and the second engagement part of the both the first guide part and the second guide part.

11. The power tool according to claim 1, further comprising:

a movable member on or in a first one of the main housing and the handle housing and configured to move in response to relative movement of a second one of the main housing and the handle housing in the front-rear direction;

a detector on or in the first one of the main housing and the handle housing and configured to detect pressing of the tool accessory against a workpiece by detecting movement of the movable member; and a control device configured to control driving of the motor based on a detection result of the detector, wherein the movable member and the detector are between the first guide part and the second guide part in the front-rear direction.

12. The power tool according to claim 1, wherein:

an outer periphery of the stator housing part has the first engagement part of the first guide part;

the second engagement part of the first guide part is inside the cover part;

the first extending part has the first engagement part of the second guide part; and the second engagement part of the second guide part is inside the second extending part.

13. The power tool according to claim 12, wherein:

one of the first engagement part and the second engagement part includes two projections that are in symmetry relative to a plane that contains the first axis and the second axis, and the other one of the first engagement part and the second engagement part includes two recesses that are in symmetry relative to the plane and that are engaged with the two projections.

14. The power tool according to claim 13, wherein:

a left-right direction of the power tool is orthogonal to both of the front-rear direction and the up-down direction;

the power tool further includes a restricting part configured to restrict relative movement between the main housing and the handle housing in the left-right direction;

the restricting part includes:

left and right first contact surfaces on the main housing; and left and right second contact surfaces on the handle housing that are configured to make contact with the left and right first contact surfaces;

the first guide part and the second guide part are above the first axis in the up-down direction; and the restricting part is below the first axis in the up-down direction.

15. A power tool having a hammer mechanism, the power tool comprising:

a motor including a stator, a rotor, and a motor shaft, the motor shaft extending from the rotor and being rotatable integrally with the rotor around a first axis;

a driving mechanism configured to perform a hammer action of linearly driving a tool accessory along a second axis using power from the motor, the second axis (i) is parallel to the first axis and (ii) is in a front-rear direction of the power tool;

a main housing that houses the motor and the driving mechanism;

a handle housing (i) connected to the main housing via a first elastic member to be movable relative to the main housing at least in the front-rear direction and (ii) including an elongate grip part behind the main housing and extending in a direction crossing the second axis; and a first guide part and a second guide part configured to guide relative sliding between the main housing and the handle housing in the front-rear direction, wherein:

each of the first guide part and the second guide part includes a first engagement part and a second engagement part that are configured to engage each other to be slidable in the front-rear direction relative to each other;

the main housing has the first engagement part;

the handle housing has the second engagement part;

the second guide part is spaced apart from the first guide part and located rearward of the first guide part in the front-rear direction;

an up-down direction of the power tool is (i) orthogonal to the second axis and (ii) corresponds to an extension direction of the grip part;

a left-right direction of the power tool is orthogonal to both of the front-rear direction and the up-down direction;

the power tool further includes a restricting part configured to restrict relative movement between the main housing and the handle housing in the left-right direction;

the restricting part includes a first contact part and a second contact part that are configured to make contact with each other;

the main housing has the first contact part;

the handle housing has the second contact part;

the first guide part and the second guide part are above the first axis in the up-down direction;

the restricting part is below the first axis in the up-down direction; and the restriction part is between the first guide part and the second guide part in the front-rear direction.

16. The power tool according to claim 15, wherein at least one of the first guide part and the second guide part is rearward of a rearwardmost end of the stator.

17. The power tool according to claim 15, wherein:

the main housing includes:

a stator housing part that houses the stator; and a first extending part (i) above the first axis and (ii) extending rearward of the stator housing part, the handle housing includes:

a cover part surrounding the stator housing part at least partially in a circumferential direction around the first axis; and a second extending part (i) extending frontward from an upper end portion of the grip part, (ii) connected to the cover part and (iii) covering at least a portion of the first extending part, a portion of the first extending part that projects into the second extending part has the first engagement part of the second guide part, and the second engagement part of the second guide part is inside the second extending part.

18. The power tool according to claim 15, wherein:

the first contact part includes a pair of first contact surfaces; and the second contact part includes a pair of second contact surfaces configured to contact the pair of first contact surfaces.

19. The power tool according to claim 15, wherein one of the first contact part and the second contact part is biased toward and in slidable contact with the other one of the first contact part and the second contact part.

20. The power tool according to claim 19, wherein:

the one of the first contact part and the second contact part includes a flexible plate member, and the plate member is biased by a second elastic member toward the other one of the first contact part and the second contact part.

* * * * *